United States Patent
Sun et al.

(10) Patent No.: US 9,996,212 B2
(45) Date of Patent: Jun. 12, 2018

(54) USER TERMINAL APPARATUS AND CONTROLLING METHOD THEREOF

(71) Applicant: Samsung Electronics Co. Ltd., Suwon-si, Gyeonggi-do (KR)

(72) Inventors: Kwang-won Sun, Suwon-si (KR); Kang-tae Kim, Yongin-si (KR); Duck-hyun Kim, Suwon-si (KR); Eun-young Kim, Yongin-si (KR); Chul-joo Kim, Suwon-si (KR); Jae-yeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 14/012,369

(22) Filed: Aug. 28, 2013

(65) Prior Publication Data

US 2014/0068504 A1    Mar. 6, 2014

(30) Foreign Application Priority Data

Aug. 28, 2012 (KR) .................... 10-2012-0094508

(51) Int. Cl.
*G06F 3/0481* (2013.01)
*G06F 3/0488* (2013.01)

(52) U.S. Cl.
CPC ........ *G06F 3/0481* (2013.01); *G06F 3/04886* (2013.01); *G06F 2203/04803* (2013.01)

(58) Field of Classification Search
CPC .... G06F 17/248; G06F 17/212; G06F 3/0481; G06F 2203/04803; G06F 3/04817; G06F 3/04842; G09G 5/14; G09G 2340/0464
See application file for complete search history.

(56) References Cited

U.S. PATENT DOCUMENTS

| | | | |
|---|---|---|---|
| 5,371,847 A | 12/1994 | Hargrove |
| 5,390,295 A | 2/1995 | Bates et al. |
| 5,712,995 A | 1/1998 | Cohn |
| 5,847,706 A | 12/1998 | Kingsley |
| 5,920,315 A | 7/1999 | Santos-Gomez |
| 6,008,809 A | 12/1999 | Brooks |
| 6,310,631 B1 | 10/2001 | Cecco et al. |
| 6,686,852 B1 | 2/2004 | Guo |
| 7,437,678 B2 | 10/2008 | Awada et al. |
| 7,802,206 B1 | 9/2010 | Davis et al. |
| 8,149,335 B2 | 4/2012 | Sudo et al. |
| 8,271,907 B2 | 9/2012 | Kim et al. |
| 8,549,429 B2 | 10/2013 | Tsuruta et al. |

(Continued)

FOREIGN PATENT DOCUMENTS

| | | |
|---|---|---|
| CN | 1344989 | 4/2002 |
| CN | 1458576 A | 11/2003 |

(Continued)

*Primary Examiner* — Tadesse Hailu
(74) *Attorney, Agent, or Firm* — Jefferson IP Law, LLP

(57) ABSTRACT

A user terminal apparatus is provided. The apparatus includes a display which displays a screen, a storage which stores at least one template for defining a layout according to which a plurality of application windows is arranged on the screen, a user interface which receives a user command, and a controller which controls the display to arrange and display the plurality of application windows based on a template selected by the user command from among the at least one template on the screen.

16 Claims, 18 Drawing Sheets

(56) References Cited

U.S. PATENT DOCUMENTS

| | | |
|---|---|---|
| 2003/0076362 A1 | 4/2003 | Terada |
| 2003/0160825 A1* | 8/2003 | Weber .................. G06F 3/0486 715/769 |
| 2004/0056903 A1 | 3/2004 | Sakai |
| 2004/0139435 A1 | 7/2004 | Cui et al. |
| 2005/0022135 A1 | 1/2005 | De Waal |
| 2005/0108655 A1 | 5/2005 | Andrea et al. |
| 2005/0188329 A1* | 8/2005 | Cutler ...................... G06F 8/38 715/804 |
| 2005/0235220 A1 | 10/2005 | Duperrouzel et al. |
| 2007/0046628 A1 | 3/2007 | Lee et al. |
| 2007/0050724 A1 | 3/2007 | Lee et al. |
| 2007/0055946 A1 | 3/2007 | Lee et al. |
| 2007/0120832 A1 | 5/2007 | Saarinen et al. |
| 2007/0133074 A1* | 6/2007 | Fabrice .................. G06T 11/60 358/537 |
| 2007/0157160 A1 | 7/2007 | Arend et al. |
| 2007/0192726 A1 | 8/2007 | Kim et al. |
| 2007/0250788 A1 | 10/2007 | Rigolet |
| 2007/0266135 A1 | 11/2007 | Friedland et al. |
| 2008/0040690 A1 | 2/2008 | Sakai |
| 2008/0066008 A1 | 3/2008 | Jeng |
| 2008/0158189 A1 | 7/2008 | Kim |
| 2008/0172609 A1 | 7/2008 | Rytivaara |
| 2008/0214239 A1 | 9/2008 | Hashimoto et al. |
| 2008/0320396 A1 | 12/2008 | Mizrachi et al. |
| 2009/0077192 A1 | 3/2009 | Nishibayashi et al. |
| 2009/0288036 A1 | 11/2009 | Osawa et al. |
| 2009/0300541 A1 | 12/2009 | Nelson |
| 2009/0307631 A1 | 12/2009 | Kim et al. |
| 2009/0322690 A1 | 12/2009 | Hiltunen et al. |
| 2010/0062811 A1 | 3/2010 | Park et al. |
| 2010/0088634 A1 | 4/2010 | Tsuruta et al. |
| 2010/0138767 A1* | 6/2010 | Wang .................... G06F 3/0481 715/769 |
| 2010/0138780 A1* | 6/2010 | Marano ................. G06F 3/1415 715/804 |
| 2010/0146431 A1 | 6/2010 | Raji et al. |
| 2010/0214278 A1 | 8/2010 | Miura |
| 2010/0248788 A1 | 9/2010 | Yook et al. |
| 2010/0293501 A1 | 11/2010 | Russ et al. |
| 2010/0313156 A1* | 12/2010 | Louch .................. G06F 3/0481 715/769 |
| 2010/0313164 A1* | 12/2010 | Louch .................. G06F 3/0481 715/790 |
| 2011/0004839 A1* | 1/2011 | Cha ....................... G06F 9/4443 715/765 |
| 2011/0099508 A1 | 4/2011 | Liu |
| 2011/0099512 A1* | 4/2011 | Jeong .................... G06F 3/0481 715/790 |
| 2011/0302528 A1 | 12/2011 | Starr |
| 2012/0033241 A1 | 2/2012 | Park et al. |
| 2012/0084689 A1* | 4/2012 | Ledet .................... G06F 3/0486 715/769 |
| 2012/0092277 A1* | 4/2012 | Momchilov ............ G06F 3/038 345/173 |
| 2012/0176322 A1 | 7/2012 | Karmi et al. |
| 2012/0208593 A1 | 8/2012 | Yang et al. |
| 2012/0242692 A1* | 9/2012 | Laubach .................. G09G 5/14 345/629 |
| 2012/0303476 A1 | 11/2012 | Krzyzanowski et al. |
| 2013/0033477 A1* | 2/2013 | Sirpal .................... G06F 1/1616 345/211 |
| 2013/0135309 A1* | 5/2013 | King ....................... G06T 15/60 345/426 |
| 2013/0205239 A1* | 8/2013 | Holland ................ G06F 9/4443 715/766 |
| 2013/0332881 A1 | 12/2013 | Yook et al. |
| 2014/0013271 A1* | 1/2014 | Moore .................. G06F 3/0482 715/792 |

FOREIGN PATENT DOCUMENTS

| | | |
|---|---|---|
| CN | 101352057 A | 1/2009 |
| CN | 102365617 A | 2/2012 |
| JP | 10-260784 | 9/1998 |
| JP | 2004-046796 | 2/2004 |
| JP | 2006-073015 | 3/2006 |
| JP | 2006-115213 | 4/2006 |
| JP | 2008-117181 | 5/2008 |
| JP | 2008-134348 | 6/2008 |
| KR | 10-2004-0040743 A | 5/2004 |
| KR | 10-2005-0017132 A | 2/2005 |
| KR | 10-0478920 B1 | 3/2005 |
| KR | 10-2006-0017030 A | 2/2006 |
| KR | 10-2006-0101963 A | 9/2006 |
| KR | 10-0650257 B1 | 11/2006 |
| KR | 10-0652626 B1 | 12/2006 |
| KR | 10-0695080 B1 | 3/2007 |
| KR | 10-0700171 B1 | 3/2007 |
| KR | 10-2009-0016044 A | 2/2009 |
| KR | 10-0900295 B1 | 5/2009 |
| KR | 10-2010-0030968 A | 3/2010 |
| KR | 10-2010-0053823 A | 5/2010 |
| KR | 10-1229629 B1 | 2/2013 |
| WO | 2008-090902 A1 | 7/2008 |
| WO | 2009-017175 A1 | 2/2009 |
| WO | 2009-028892 A2 | 3/2009 |

* cited by examiner

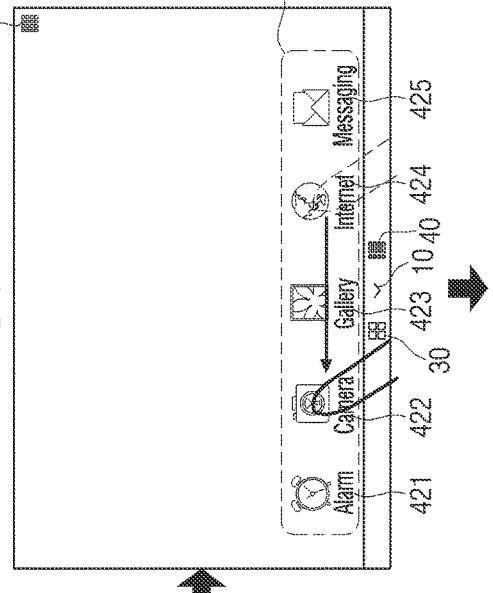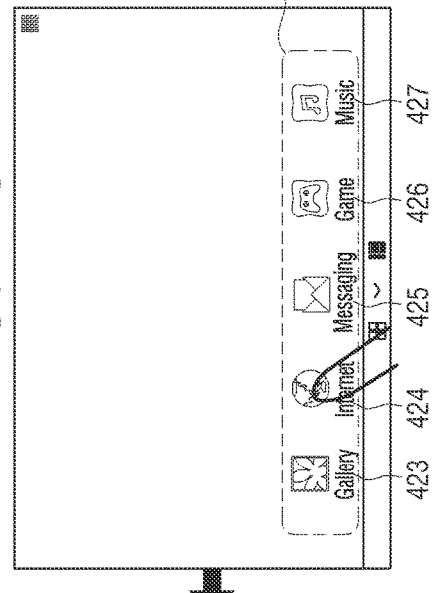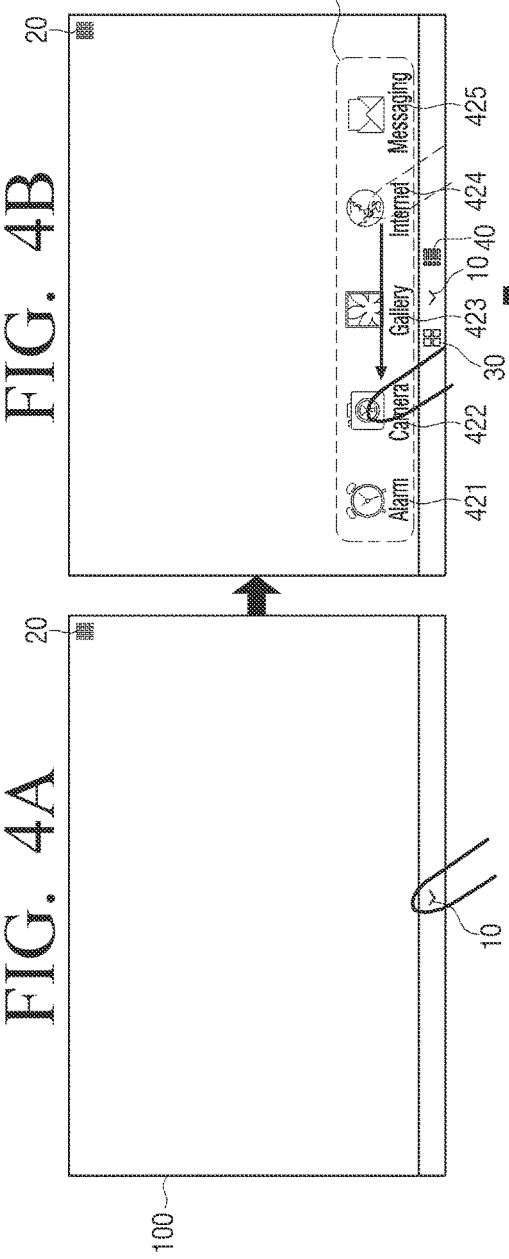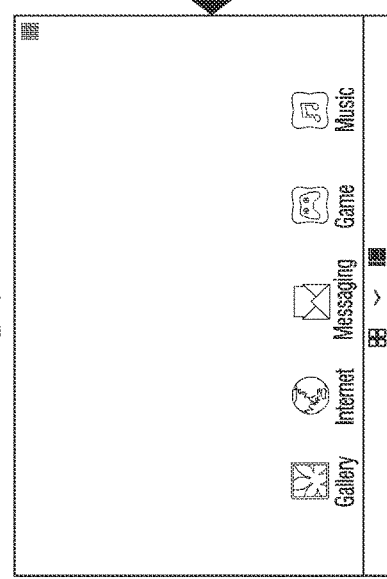

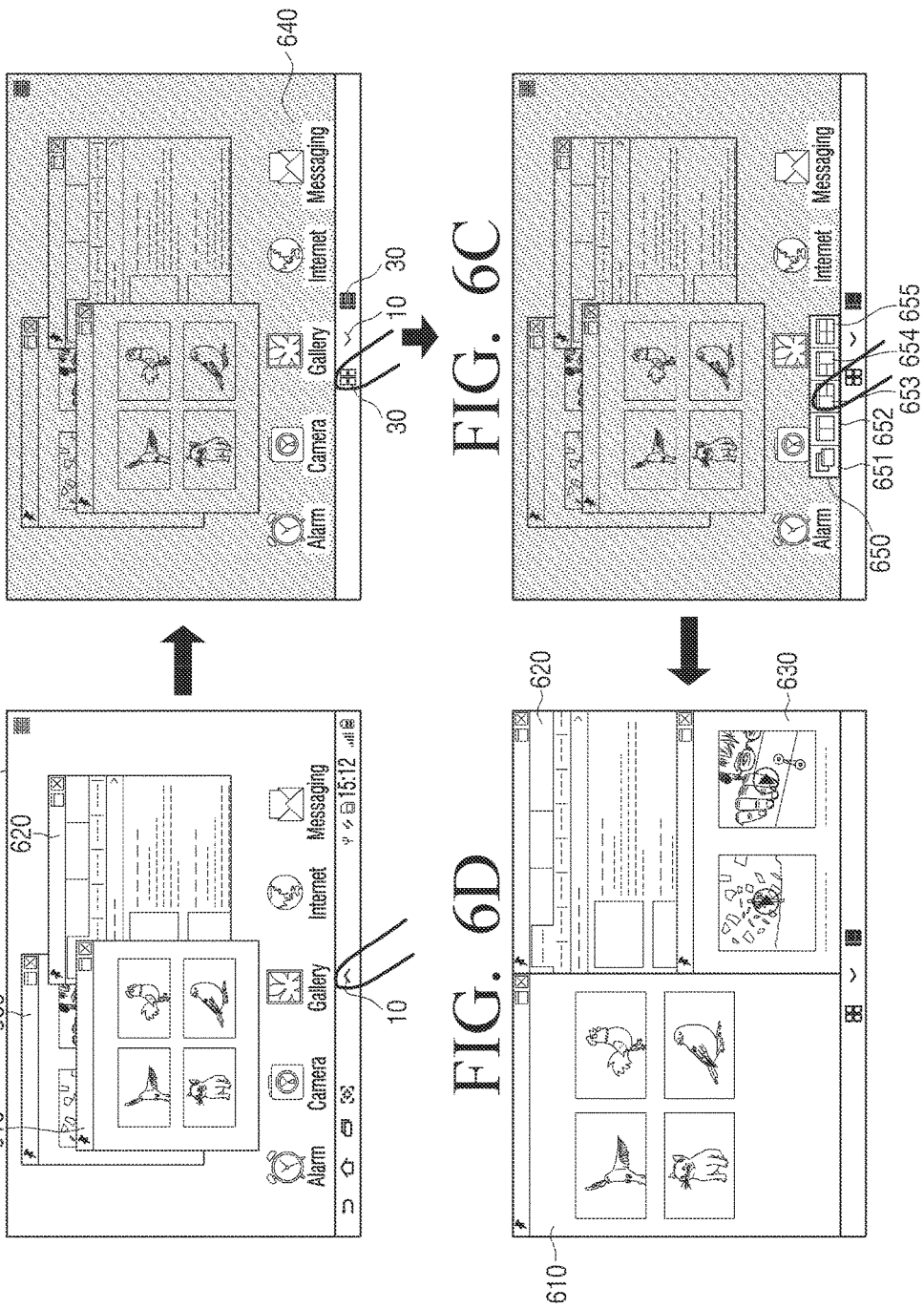

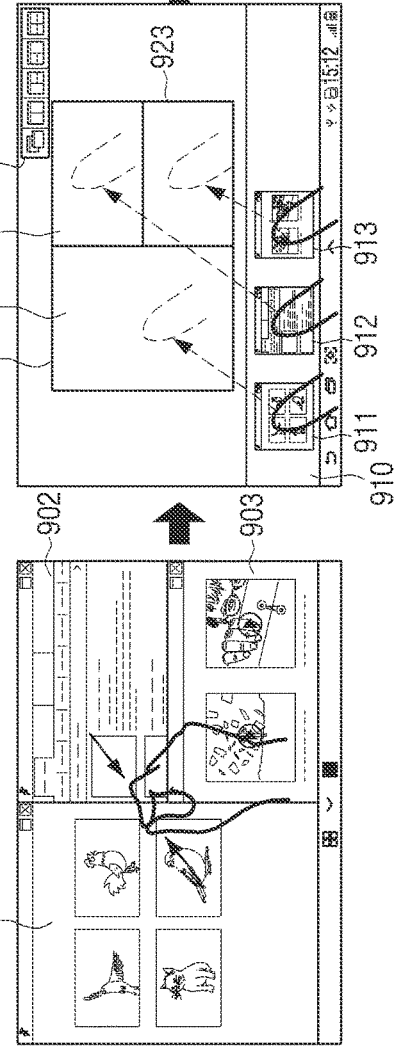

FIG. 10A
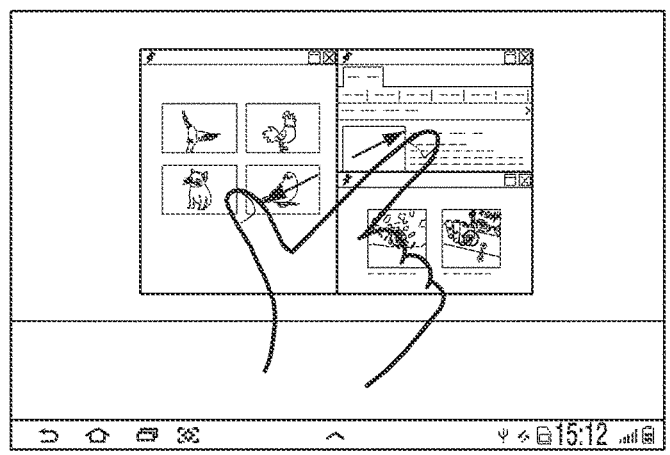
FIG. 10B
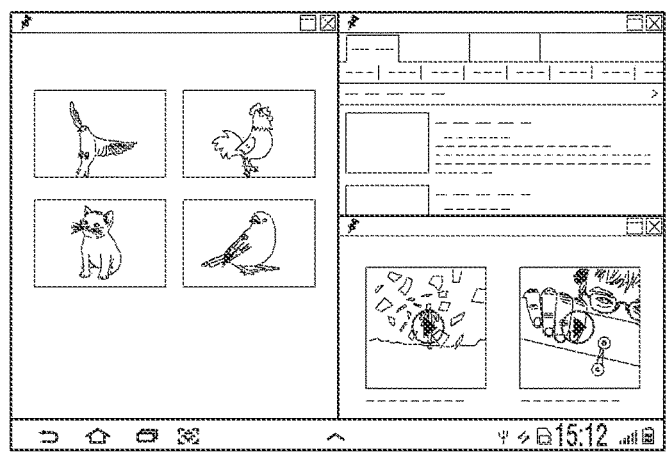

USER TERMINAL APPARATUS AND CONTROLLING METHOD THEREOF

CROSS-REFERENCE TO RELATED APPLICATIONS

This application claims the benefit under 35 U.S.C. § 119(a) of a Korean patent application filed on Aug. 28, 2012 in the Korean Intellectual Property Office and assigned Serial No. 10-2012-0094508, the entire disclosure of which is hereby incorporated by reference.

BACKGROUND OF THE INVENTION

1. Field of the Invention The present invention relates to a user terminal apparatus and a controlling method thereof. More particularly, the present invention relates to a user terminal apparatus which provides a plurality of application windows in multi-tasking environment and a controlling method thereof.

2. Description of the Related Art

Support of electronic technology development has enabled development of various types of display apparatuses. Specifically, display apparatuses such as a TV, a Personal Computer (PC), a lap-top computer, a tablet PC, a mobile phone, and a MP3 player are widely distributed and used.

In order to meet user needs for newer and more various functions, mobile terminals such as tablet PCs and mobile phones provide a multi-tasking environment to simultaneously implement a plurality of applications.

Thus, a method of managing a plurality of application windows in multi-tasking environment is necessary.

Therefore, a need exists for an apparatus and method for arranging and displaying a plurality of application windows on a multi-tasking environment.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. However, the present invention is not required to overcome the disadvantages described above, and an exemplary embodiment of the present invention concept may not overcome any of the problems described above.

An aspect of the present invention, a technical objective is to provide a user terminal apparatus capable of arranging a plurality of application windows on multi-tasking environment and displaying the same, and a controlling method is provided.

In accordance with an aspect of the present invention, a user terminal apparatus is provided. The apparatus includes a display which displays a screen, a storage which stores at least one template for defining a layout according to which a plurality of application windows is arranged on the screen, a user interface which receives a user command, and a controller which controls the display to arrange and display the plurality of application windows based on a template selected by the user command from among the at least one template on the screen.

In accordance with an aspect of the present invention, the plurality of application windows may include at least one of currently-executed application windows and application windows to be executed after the template is selected.

In accordance with an aspect of the present invention, the controller may arrange the plurality of application windows on window areas within the selected template according to a predetermined arranging order.

In accordance with an aspect of the present invention, the controller may consecutively arrange the plurality of executed application windows on window areas within the template based on an order of arranging the plurality of executed application windows on a Z-axis of the screen.

In accordance with an aspect of the present invention, the plurality of executed application windows may be consecutively arranged on window areas within the template based on a priority of a higher Z-order for arranging the plurality of executed application windows on the Z-axis.

In accordance with an aspect of the present invention, if the number of the plurality of executed application windows is more than the number of the window areas within the template, the controller may overlap and display the executed applications windows on the window areas within the template, and if the number of the plurality of executed application windows is less than the number of the window areas within the template, the controller may display the window areas such that application windows are not arranged as blank among the window areas within the template.

In accordance with an aspect of the present invention, if one executed application window is arranged on one window area within the template and if another executed application window is arranged to be overlapped on the one window area within the template, the controller may overlap and display the another application window on a lower portion of the one application window.

In accordance with an aspect of the present invention, the controller may consecutively arrange one or more application windows executed after selecting of the template on the window areas within the template according to an order of execution.

In accordance with an aspect of the present invention, if a new application window is executed in a state in which the plurality of executed application windows are arranged and displayed on all the window areas within the template, the controller may overlap and display the new application window on an upper portion of one of the plurality of application windows.

In accordance with an aspect of the present invention, the controller may provide, according to a predetermined user command, at least one of: a window edit mode in which a plurality of executed application windows are arranged within the template according to user selection; and a template edit mode in which the user performs at least one of editing prestored templates and creating a new template.

In accordance with an aspect of the present invention, if a predetermined menu item is selected, the controller may display at least one template on an area of the screen.

In accordance with an aspect of the present invention, the user terminal apparatus includes an input unit into which a touch input is entered.

In accordance with an aspect of the present invention, a method of controlling a user terminal apparatus is provided. The method includes receiving a user command to select a template for defining a layout according to which of a plurality of application windows is arranged on a screen, and arranging and displaying a plurality of application windows on the screen based on the selected template according to the user command.

In accordance with an aspect of the present invention, the plurality of application windows may include at least one of currently-executed application windows and application windows to be executed after the template is selected.

In accordance with an aspect of the present invention, the displaying of the plurality of application windows may include arranging the plurality of application windows on window areas within the selected template according to predetermined arranging order.

In accordance with an aspect of the present invention, the displaying of the plurality of application windows may include consecutively arranging the plurality of executed application windows on window areas within the template based on an order of arranging the plurality of executed application windows on a Z-axis of the screen.

In accordance with an aspect of the present invention, the displaying of the plurality of application windows may include, if the number of the plurality of executed application windows is more than the number of the window areas within the template, overlapping and displaying the executed applications windows on the window areas within the template, and if the number of the plurality of executed application windows is less than the number of the window areas within the template, displaying the window areas such that application windows are not arranged as blank among the window areas within the template.

In accordance with an aspect of the present invention, the displaying of the plurality of application windows may include, if one executed application window is arranged on one window area within the template and if another executed application window is arranged to be overlapped on the one window area within the template, overlapping and displaying the another application window on a lower portion of the one application window.

In accordance with an aspect of the present invention, the displaying may include consecutively arranging one or more application windows executed after selecting of the template on the window areas within the template according to an order of execution.

In accordance with an aspect of the present invention, if a new application window is executed in a state in which the plurality of executed application windows are arranged and displayed on all the window areas within the template, the method may include overlapping and displaying the new application window on an upper portion of one of the plurality of application windows.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 4A, 4B, 4C, and 4D are diagrams illustrating a method of displaying applications supporting multi-window mode according to an exemplary embodiment of the present invention;

FIGS. 6A, 6B, 6C, 6D, 7A, 7B, 7C, 7D, 7E, 8A, 8B, 8C, 9A, 9B, 9C, 10A, 10B, 11A, 11B, 12A, and 12B are diagrams illustrating a method of displaying screen according to an exemplary embodiment of the present invention:

Throughout the drawings, it should be noted that like reference numbers are used to depict the same or similar elements, features, and structures.

DETAILED DESCRIPTION OF EXEMPLARY EMBODIMENTS

Figure 1A:
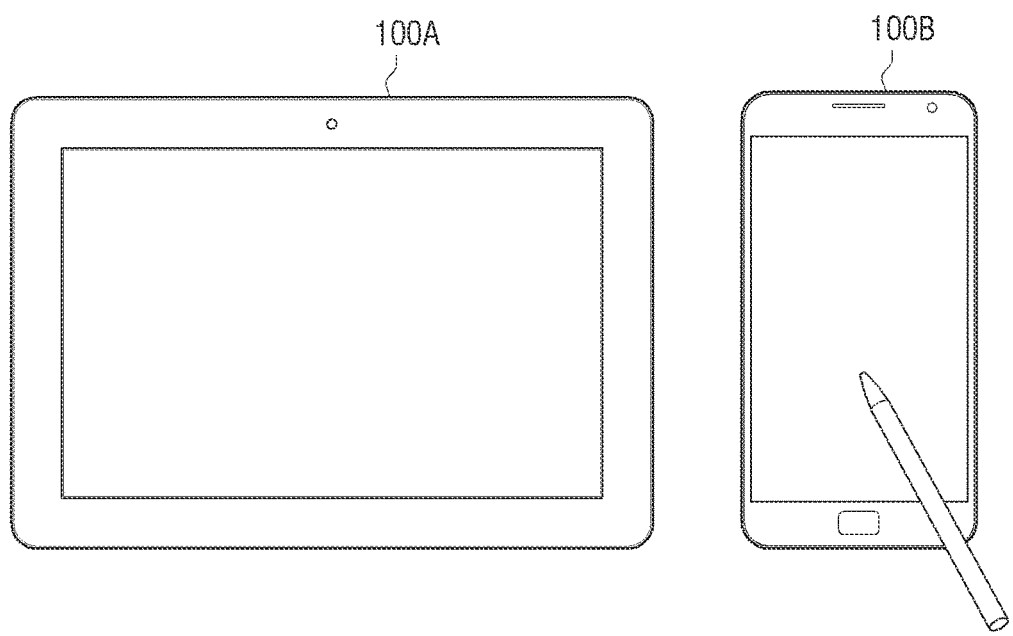
FIGS. 1A and 1B are diagrams illustrating a user terminal apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, same drawing reference numerals are used for the same elements even in different drawings. The matters defined in the description, such as detailed construction and elements, are provided to assist in a comprehensive understanding of the present invention. Accordingly, it is apparent that the exemplary embodiments of the present invention can be carried out without those specifically defined matters. Also, well-known functions or constructions are not described in detail because such a description would obscure the invention with unnecessary detail.

Figure 1B:
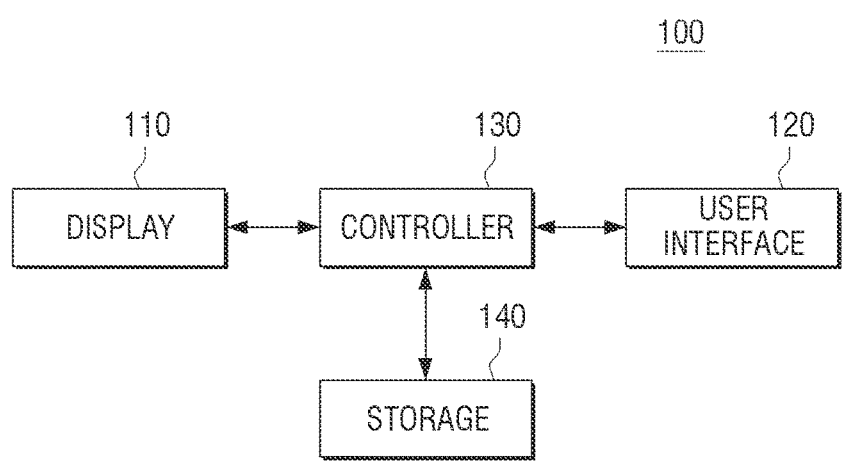

FIGS. 1A and 1B are diagrams illustrating a user terminal apparatus according to an exemplary embodiment of the present invention.

Referring to FIG. 1A, a user terminal apparatus 100 may be implemented to be a tablet Personal Computer (PC) 100A. However, the user terminal apparatus 100 is not limited to a tablet PC. For example, the user terminal apparatus 100 may be implemented as various types of apparatuses such as a mobile phone 100B including a smart phone, a Personal Media Player (PMP), a Personal Digital Assistant (PDA), or a Global Positioning System (GPS) device, as long as the apparatuses have a display function and are portable. Further, the user terminal apparatus 100 may include a touch screen to allow a user to input commands for executing programs with a finger, a pen 102, and/or the like.

More specifically, the tablet PC as one of examples of the user terminal apparatus 100 according to an exemplary embodiment of the present invention combines mobility of the PDA and functions of the laptop computer. Thus, while having functions of the desktop, wireless internet may be used. Although a main means for input is a touch screen, a conventional keyboard, a mouse, or the like may be connected and used.

Meanwhile, the user terminal apparatus 100 may provide a multi-tasking environment to simultaneously run a plurality of applications and carry out jobs. Hereinbelow, a method of providing a plurality of application windows in multi-tasking environment according to exemplary embodiments of the present invention will be described.

Referring to FIG. 1B, the user terminal apparatus 100 may include a display 110, a user interface 120, a controller 130, and a storage 140.

The display 110 may display a screen. In an exemplary embodiment of the present invention, the screen may include an application executing screen having various objects such as image, video image, text, a Graphic User Interface (GUI) screen, and the like.

More specifically, the display 110 may simultaneously display a plurality of application executing screens (e.g., may simultaneously display a plurality of application windows on a screen). This specific mode of displaying screen will be herein referred to as 'multi-window mode'.

An application window provided on multi-window mode may be provided in a form that allows implementation of functions including moving position, adjusting size, or pin-up. Thus, the application window may include a title area having menu items to provide the corresponding functions and may be implemented to have a predetermined size. More specifically, the title area may include a maximization button, a finish button, or a pin-up button. According to manipulating on each button, an instruction of maximizing window, finishing window, or a pin-up window may be inputted. Meanwhile, the application window provided on multi-window mode may be implemented in a smaller size to occupy part of the entire screen area on the display 110 so as to allow convenient implementation of moving position and adjusting size. Such window mode will be herein referred to as 'mini mode' or 'free style mode'. In an exemplary embodiment of the present invention, the application window may be displayed to cover the entire screen size according to size adjustment by a user.

Further, the display 110 may display one application window in a maximized size on the whole screen area. The above screen displaying mode will be referred to herein as a 'normal mode'. The application window provided on the normal mode may be provided in a form that does not have a title area so as to provide a user with as large an application executing screen as possible. If the application window provided on the normal mode has a maximized size to cover the whole screen area on the display 110, the mode will be referred to as a 'maximization mode' or 'split mode' herein. If a plurality of application windows are displayed on the split mode, screen area may be divided and the plurality of application windows may be displayed in each divided area.

Meanwhile, the display 110 may be implemented as Liquid Crystal Display (LCD) panel, Organic Light Emitting Diodes (OLED), or the like, although the display is not limited thereto. Specifically, the display 110 may be implemented as a touch screen having inter-layer structure with a touch pad. In this case, the display 110 may be used as the user interface 120 as well as an output device, which will be described below. A touch screen may be configured to detect a touch input pressure, a touch input position, a touch input area, and the like.

The user interface 120 may receive various user commands. For example, the user interface 120 may receive a user command to display a title area on an application window.

According to an exemplary embodiment of the present invention, the user interface 120 may receive a user command to display the title area on application window when application window is displayed on maximization mode to cover whole screen area. The 'user command' may be user manipulation corresponding to touching a predetermined area of application window, such as a one-tap manipulation, and the like, although the user manipulation is not limited thereto. Accordingly, the user command may be a flick manipulation or a drag manipulation. According to an exemplary embodiment of the present invention, a certain area may be preset to be an information display area or a menu display area provided on, for example, the top of the application window, although not limited thereto.

When the maximized application window is displayed, the title area, displayed according to the user command, may provide a restore button which restores the window to mini mode or a finish button which closes the window. For example, in addition to the touch manipulation directed to the area excluding the area having buttons on the title area, a user command to restore maximization mode to mini mode may be received by a touch manipulation directed to the restore button on the title area, as described above.

According to exemplary embodiments of the present invention, the user interface 120 may receive a user command to restore the mini mode by reducing the application window by a predetermined size while the title area is displayed on the application window. The user command may be touch manipulation directed to the area excluding the area having buttons on the title area, or a touch manipulation directed to the window restore button provided on the title area.

The user interface 120 may receive a user command to restore window to mini mode while the application window is in maximized state and while the title area is not displayed. The user command may be a two-tap manipulation, flick-down manipulation, or drag-down manipulation directed to the information display area.

The user interface 120 may receive a user command to move application window position, a user command to adjust application window size, or a user command to pin-up application window on multi-window mode. The user command to pin-up may be implemented as a pin-up on/off by a tap manipulation directed to the pin-up button. Thus, when pin-up is on, the application window may be displayed in a fixed form. If pin-up is off, the application window may be implemented in a form in which moving position and adjusting size are possible.

The controller 130 may control the overall operation of the user terminal apparatus 100.

Displaying a Plurality of Application Windows on Multi-Window Mode

The controller 130 may control the display 110 to arrange and display a plurality of application windows on a screen based on the template selected by a user command inputted through the user interface 120 from among one or more templates stored in the storage 140. The plurality of application windows may include at least one of the application windows executed following selection of a currently-executing application window and template.

If a predetermined menu item is selected, the controller 130 may display at least one of the templates stored in the storage 140 on one area of a screen. For example, menu items to select templates may be installed on a screen, and if a menu item may be selected, at least one of previously stored templates may be arranged and displayed so that a user can select a template according to the user's preferences. In this case, the menu item may be displayed as an icon shape showing specific template format, although such a display configuration is not limited thereto.

The controller 130 may arrange a plurality of application windows on windows within the selected template according to a predetermined arrangement order. The 'predetermined arrangement order' as used herein may be left-to-right direction (from − to + on X axis of screen), top-to-bottom direction (from − to + on Y axis of screen), or top-to-bottom direction on Z axis of screen (from − to + on Z axis of screen) based on the windows within a template.

For example, if a template dividing a screen into four equal parts is selected and if there are five application windows to be arranged, a first application window is placed on left top area, a second application window is placed on right top area, a third application window is placed on left bottom area, a fourth application window is placed on right bottom area, and a fifth application window is placed to overlap a lower portion of the first application window placed on the left top area. Thus, if a first application window closes, a fifth application window may be displayed on the left top area.

Further, the controller 130 may consecutively arrange a plurality application windows which is currently executed on the window within a template, based on an order of arranging the plurality of executed application windows toward Z direction of the screen.

According to an exemplary embodiment of the present invention, the first to fifth applications may be application windows displayed in sequence on a current screen from + direction of Z axis to − direction of Z axis. In other words, if a plurality of application windows is executed, the plurality of application windows may be overlapped and displayed on each other in the Z axis direction of the screen before the application window is arranged based on template. In this case, a most recently operated application may be displayed on the highest portion. The application windows within template may thus be arranged by considering an operating order according to an exemplary embodiment of the present invention.

According to an exemplary embodiment of the present invention, application windows may be arranged within a template according to an application executing order, a frequency of operating executed application windows, an operating hour (or time), and the like. For example, a plurality of currently-operating application windows may be arranged and displayed according to a predetermined arrangement order that gives priority to higher operating frequency.

The controller 130 may properly arrange the application windows within template according to the number of executed application windows and the number of windows within the selected template.

The controller 130 may arrange executed application windows to overlap other windows within a template, if the number of executed application windows is more than the number of windows within the selected template. If a first executed application window is arranged on a first window within the template and a second executed application window is arranged to overlap the first window within the template, the controller 130 may arrange the second application window to overlap on the lower portion of the first application window. Because the example is already described above, this will not be further explained below.

Further, if the number of executed application windows is less than the number of windows within template, the controller 130 may display a blank area for a window area in which the application window is not arranged, among the windows within the selected template. If new application window is executed, the new application window may be automatically displayed on the blank area.

Further, the controller 130 may perform arranging of the application windows executed following selecting of a template, on the window area within the template according to the same arrangement order.

In this case, if the new application window is executed while a plurality of executed application windows are arranged and displayed on every window within the selected template, the controller 130 may overlap and display the new application window on the upper portion of one of the plurality of application windows. For example, if the most currently arranged application window is a left window of the windows within template dividing a screen into two equal parts, the new application window may be overlapped and displayed on the next order (e.g., on the right window).

According to an exemplary embodiment of the present invention, a template may automatically change based on the number of executed applications. For example, if a template dividing a screen to two equal parts is selected, and if new application window is executed while there are two application windows arranged on the two windows within the template respectively, the template may automatically change to a template that can arrange three application windows on a screen, and thus, three executed application windows may be consecutively arranged on a screen.

According to an exemplary embodiment of the present invention, a template may be recommended according to the number of executed applications. For example, if a template having format dividing a screen into two equal parts is selected, and if a new application window is executed while there are two application windows arranged on two windows within the template respectively, another template that can arrange three application windows on a screen may be recommended to the user.

The above methods of automatically changing and recommending may be applied by considering operating frequency or numbers of application windows. For example, the methods of automatically changing and recommending may be applied only if repeated operations are performed more than a predetermined frequency on both of the two executed application windows in the above exemplary embodiment.

Window Edit Mode

If a predetermined user command is inputted, the controller 130 may provide a window edit mode screen so as to arrange a plurality of executed application windows according to a user selection on a window within the selected template. The predetermined user command may be a pinch manipulation on a screen. Specifically, the predetermined user command may be a pinch-in manipulation that uses multi-touch. Further, the window edit mode screen may close according to a pinch-out manipulation. The 'pinch-in manipulation' as used herein refers to manipulation of two fingers joining closer while 'pinch-out manipulation' as used herein refers to manipulation of the two fingers moving apart from each other. According to exemplary embodiments of the present invention, another user manipulation such as flick-up and flick-down may be used, or another menu time to enter and exit window edit mode screen may be provided.

On window edit mode, the application window position may be adjusted within template according to a drag-and-drop user manipulation. In this case, the size of the moved application window may be automatically adjusted to correspond to the window size within template.

Further, on the window edit mode, currently executed applications may be displayed on the lower portion. Thus, a user may select an application and arrange the application on a desired area. In this case, an image corresponding to the application may be displayed on part of the corresponding application window area so that a user can recognize the application.

Further, a new application window may also be executed on the window edit mode, and the corresponding application window may be added to the lower area showing therein currently executed applications. Other detailed functions of the window edit mode will be described below by referring to the drawings.

Template Edit Mode

If a predetermined user command is inputted, the controller 130 may provide a template edit mode so that a user can edit previously stored templates or create new template. The 'predetermined user command' as used herein may be a multi-touch user manipulation including, for example, pinch-in, pinch-out, flick-up, flick-down, and the like. According to exemplary embodiments of the present invention, depending on need and/or user preferences, another menu item to enter and exit template edit mode screen may be provided.

On the template edit mode, a user may edit previously stored templates according to the user's needs and/or preferences and create a new template. For example, the user may adjust and edit window size within template divided into two equal parts from 1:1 ratio to 2:1 ratio. Other detailed functions of the template edit mode will be described below by referring to the drawings.

According to an exemplary embodiment of the present invention, the template editing may be performed on the window edit mode.

Method of Controlling Screen on Other Multi-Window Mode

The controller 130 may control the user terminal apparatus 100 so that the application window is reduced to a predetermined size (e.g., displayed on mini mode on the multi-window mode). In this case, a title area may be displayed in a fixed manner on one part of mini window area. Therefore, on the maximization mode in which the application window is displayed on the whole screen area, the title area may not be displayed basically and may be displayed according to a user command. However, on the multi-window mode, the title area may be displayed basically in a fixed manner. According to an exemplary embodiment of the present invention, the title area may be displayed according to a user command even on the mini mode.

Further, the controller 130 may control the user terminal apparatus 100 so that a guide GUI is displayed to provide guide about position movement and size adjustment of the application windows on the multi-window mode according to a user command. In this case, the controller 130 may control the guide GUI to provide haptic feedback on an area on which the guide GUI is displayed.

Further, the controller 130 may provide various menu items to implement the multi-window mode and the normal mode.

The storage 140 may perform a function of storing at least one or more templates defining layout to arrange a plurality of application windows on a screen. For example, the storage 140 may store various formats of templates provided by the number of windows. Further, templates edited by using the templates stored in the storage 140 or newly created templates may be additionally stored in the storage 140.

Figure 2:
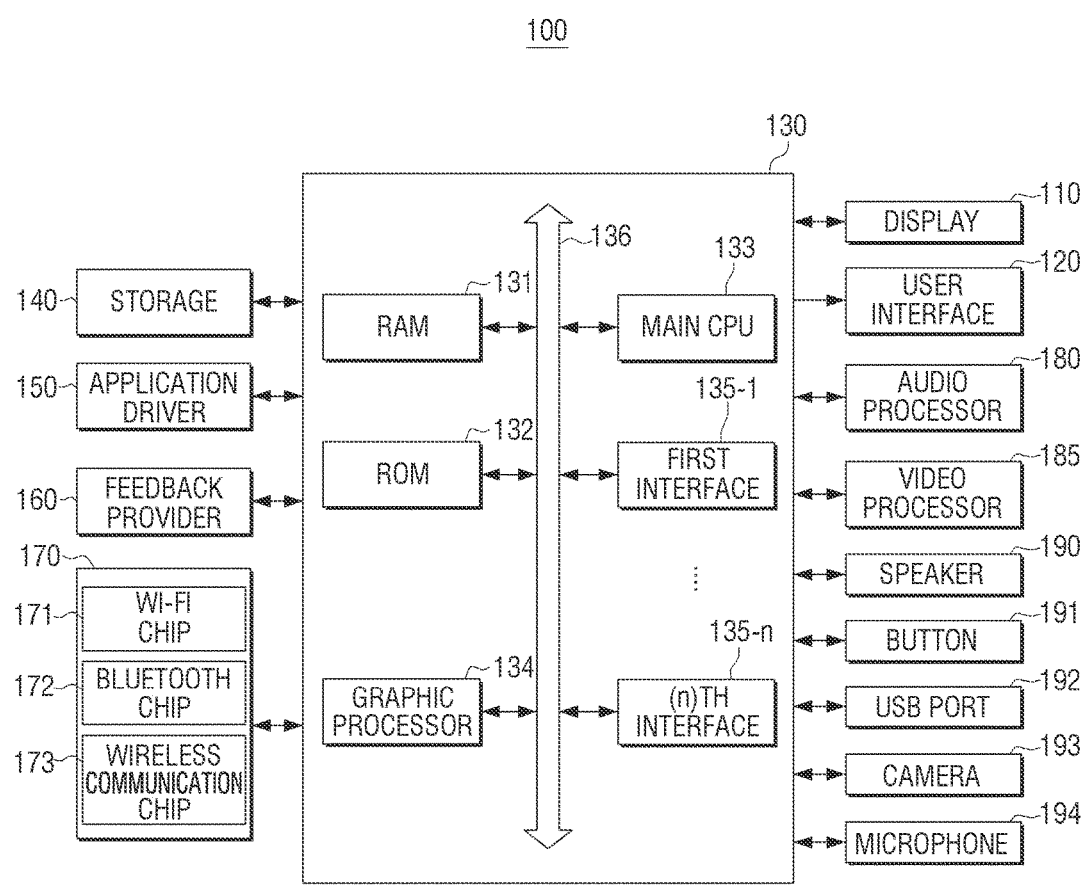
FIG. 2 is a detailed block diagram of the user terminal apparatus according to an exemplary embodiment of the present invention.

FIG. 2 is a detailed block diagram of the user terminal apparatus according to an exemplary embodiment of the present invention.

Referring to FIG. 2, the user terminal apparatus 100 may include a display 110, a user interface 120, a controller 130, a storage 140, an application driver 150, a feedback provider 160, a communicator 170, an audio processor 180, a video processor 185, a speaker 190, a button 191, a USB port 192, a camera 193, and a microphone 194. Among the components illustrated in FIG. 2, the components described above with reference to FIG. 1 will not be further explained as such a description would be redundant.

The operation of the controller 130 may be performed by programs stored in the storage 140. The storage 140 may store various data such as an Operating System (OS) software module to drive the user terminal apparatus 100, various applications, various data inputted or established while executing applications, or content. Particularly, depending on the characteristics thereof, the applications stored in the storage 140 may be classified into applications that support multi-window mode and other applications that do not support the multi-window mode.

Further, the storage 140 may store various types of templates predefining layout to arrange a plurality of application windows on the multi-window mode.

Other various software modules stored in the storage 140 will be described below by referring to FIG. 3.

The application driver 150 may drive and implement applications that the user terminal apparatus 100 can provide. The 'application' as used herein may refer to the programs that can automatically run which may include various multimedia content. The term, 'multimedia content' as used herein includes text, audio, still images, animation, video, interactivity content, Electronic Program Guide (EPG) content from content provider, electronic message received from users, or information regarding current events, although not limited thereto.

The feedback provider 160 may perform a function of providing various feedbacks according to functions implemented in the user terminal apparatus 100.

For example, the feedback provider 160 may provide haptic feedback regarding a GUI displayed on a screen. The haptic feedback technology, or computer touch technology enables users to feel touch, by generating vibration, power or impact in the user terminal apparatus 100. The feedback provider 160 may provide haptic feedback regarding guide a GUI, if the guide GUI is displayed to provide guide about position movement and size adjustment of application windows according to user command on the multi-window mode.

In this case, the feedback provider 160 may provide various feedbacks by differently applying vibrating conditions such as a vibrating frequency, a vibrating length, a vibrating shape, a vibrating position, and the like according to controlling of the controller 130. A method of generating various haptic feedback by differently applying vibration corresponds to technology according to the related art, and will not be further explained for the sake of brevity.

Although the feedback provider 160 may use a vibration sensor and provide haptic feedback, according to exemplary embodiments of the present invention haptic feedback may be provided by using a piezo sensor.

The communicator 170 may configured to communicate with various types of external apparatuses according to various types of communication methods. The communicator 170 may include various communication chips such as a Wi-Fi chip 171, a Bluetooth chip 172, a wireless communication chip 173, and the like.

The Wi-Fi chip 171 and the Bluetooth chip 172 may communicate according to Wi-Fi method and Bluetooth method, respectively. The wireless communication chip 173 may communicate according to various communication protocols such as Institute of Electrical and Electronics Engineers (IEEE) standards, ZigBee, 3rd Generation (3G), 3rd Generation Partnership Project (3GPP), or Long Term Evolution (LTE). The communicator 170 may further include a Near Field Communication (NFC) chip operating according to NFC method using 13.56 MHz from the various RF-ID frequency bandwidths such as 135 kHz, 13.56 MHz, 433 MHz, 860~960 MHz, and 2.45 GHz.

The audio processor 180 is configured to process audio data. In the audio processor 180, various audio data processing such as decoding, amplifying, or noise filtering may be implemented.

The video processor 185 is configured to process video data. In the video processor 185, various video data processing such as decoding, scaling, noise filtering, converting frame rate, or converting resolution may be implemented.

The speaker 190 is configured to output various alarm sounds and voice messages as well as various audio data processed in the audio processor 180.

The button 191 may correspond to various types of buttons such as a mechanical button, a touch pad, or a wheel installed on a random area of front face, side face, or back face of a body of the user terminal apparatus 100. For example, a button to turn electrical power on/off may be installed on the user terminal apparatus 100.

The USB port 192 may perform communication with various external apparatuses through USB cables or charge electric power.

The camera 193 is configured to photograph still image or video image according to controlling of a user. The camera 193 may be implemented with a plurality of cameras including a front face camera and a back face camera.

The microphone 194 is configured to receive user voices or other sounds and to convert the received sound into audio data. The controller 130 may use user voices inputted through the microphone 194 during a call. The controller 130 may convert user voices into audio data and store the audio data in the storage 140.

If the camera 193 and the microphone 194 are provided, the controller 130 may perform controlling operation according to user voices inputted through the microphone 194 or according to user motions recognized by the camera 193. For example, the user terminal apparatus 100 may operate on motion controlling mode and voice controlling mode. If operating on motion controlling mode, the controller 130 may activate the camera 193 to photograph a user, trace changes in user motions and perform corresponding controlling operations. If operating on voice controlling mode, the controller 130 may analyze user voices inputted through the microphone and perform controlling operations according to the analyzed user voices (e.g., may operate on voice recognizing mode).

According to exemplary embodiments of the present invention, the user terminal apparatus 100 may include various external inputting ports to connect various external components such as a headset, a mouse, a LAN, and the like.

The controller 130 may control the overall operation of the user terminal apparatus 100 by using various programs stored in the storage 140.

For example, the controller 130 may implement applications stored in the storage 140, create an implementing screen, and display the screen. Further, the controller 130 may play various content stored in the storage 140. The controller 130 may also communicate with external apparatuses through the communicator 170.

According to exemplary embodiments of the present invention, the controller 130 may include a Random Access Memory (RAM) 131, a Read Only Memory (ROM) 132, a main Central Processing Unit (CPU) 133, a graphic processor 134, first to (n)th interfaces 135-1~135-n, a bus 136, and the like.

The RAM 131, the ROM 132, the main CPU 133, the graphic processor 134, and the first to (n)th interfaces 135-1~135-n may connect to each other through the bus 136.

The first to (n)th interfaces 135-1~135-n may connect to the sorts of components as described above. According to exemplary embodiments of the present invention, one of the interfaces may be a network interface connecting to external apparatuses through network.

The main CPU 133 may access the storage 140, and perform booting by using the Operating System (OS) stored in the storage 140. The main CPU 133 may perform various operations by using various programs, content, and data stored in the storage 140.

The ROM 132 may store therein a set of commands to boot the system. If a command to turn-on is inputted and if electrical power is provided, the main CPU 133 may load the OS stored in the storage 140 to the RAM 131 according to commands stored in the ROM 132, run the OS, and boot the system. If booting completes, the main CPU 133 may paste various application programs stored in the storage 140 to the RAM 131, implement the application programs pasted on the RAM 131, and perform various operations.

The graphic processor 134 may create a screen including various objects such as icons, images, or text by using a calculator (not illustrated) and a renderer (not illustrated). The calculator may calculate attribute values such as coordinates, shapes, sizes, or colors of each object to be displayed according to screen layout by using a control command received from an inputter 134. The renderer may create a screen of various layouts including objects based on the attribute values calculated by the calculator. The screen created by the renderer may be displayed within a display area of the display 110.

According to exemplary embodiments of the present invention, the user terminal apparatus 100 may additionally include a detector (not illustrated). The detector (not illustrated) may detect various manipulations of the user terminal apparatus 100 such as touching, rotating, sliding, pressing, and zooming.

According to exemplary embodiments of the present invention, the detector (not illustrated) may include a touch sensor for detecting touch. A touch sensor may be implemented as a capacitive type or a resistive type. The capacitive type sensor uses coated conductive material on the surface of the display 150, detects micro electricity excited by movement of a user when a user touches the surface of the display 110 (e.g., with the user's hand, a pen, or the like), and calculates touch coordinate. The resistive type sensor includes two electrode panels, detects the electrical current flow caused by contacting upper panel and lower panel on a touch point if a user touches the screen, and calculates touch coordinate. The touch sensor may be implemented with various types as explained above. The detector may further include a geomagnetic sensor to detect rotating situation and moving direction of the user terminal apparatus 100, an acceleration sensor to detect sliding degree of the user terminal apparatus 100, and the like.

FIG. 2 shows an example of the detailed configuration of the user terminal apparatus 100. According to exemplary embodiments of the present invention, certain component(s) of FIG. 2 may be excluded or modified, or other component(s) may be added. For example, a Global Positioning System (GPS) receiver (not illustrated) for receiving GPS signals from the GPS satellite and for calculating current position of the user terminal apparatus 100, or a Digital Multimedia Broadcasting (DMB) receiver (not illustrated) for receiving and processing DMB signals may be further included.

Figure 3A:
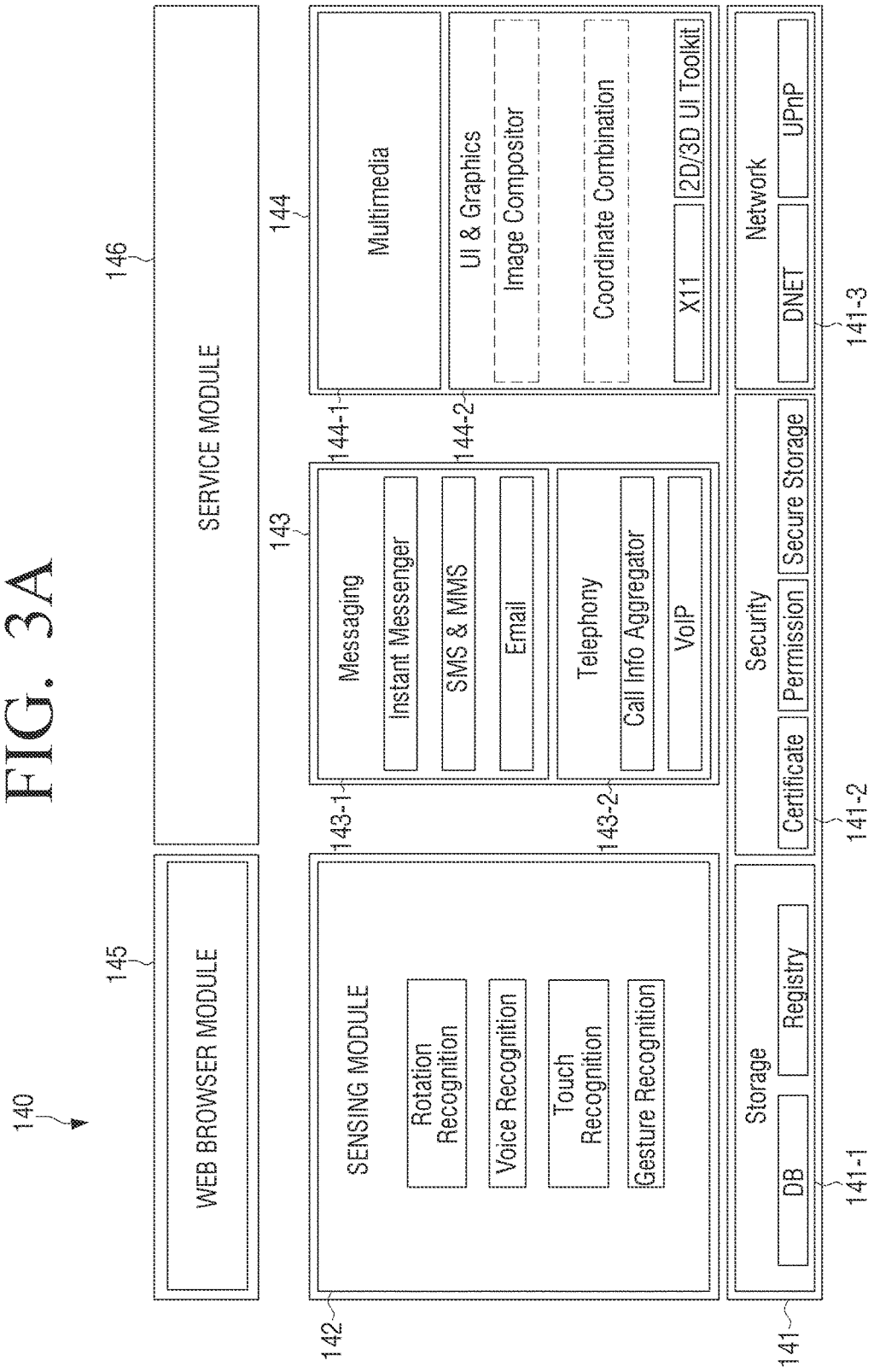
FIGS. 3A and 3B are diagrams illustrating a software structure stored in a storage according to an exemplary embodiment of the present invention.
Figure 3B:
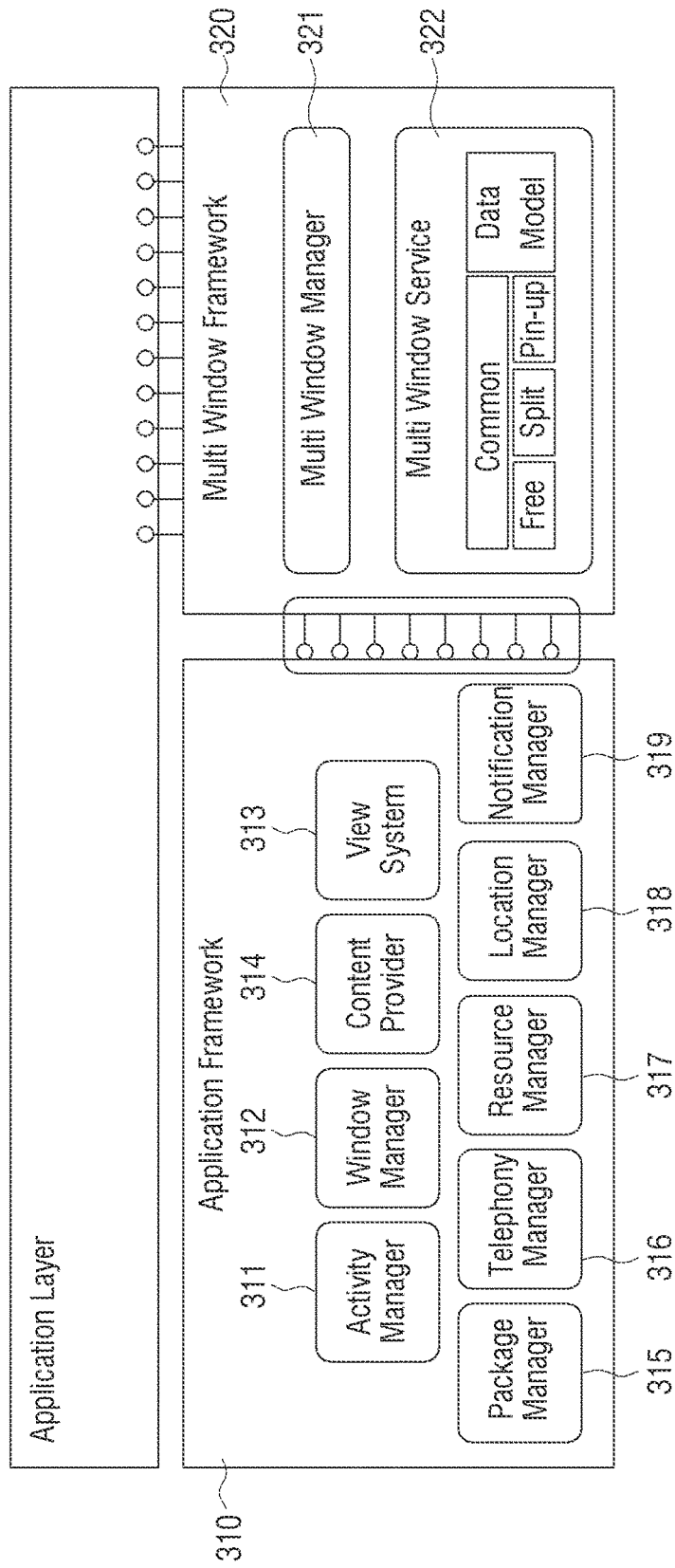

FIGS. 3A and 3B are diagrams illustrating a software structure stored in a storage.

Referring to FIG. 3A, the storage 140 may store software having a base module 141, a sensing module 142, a communicating module 143, a presentation module 144, a web browser module 145, and a service module 146.

The base module 141 is a basic module which processes signals transmitted from hardware included in the user terminal apparatus 100 and delivers the processed signals to a higher layer module. The base module 141 includes a storage module 141-1, a security module 141-2, a network module 141-3, and/or the like. The storage module 141-1 is a program module which manages a Database (DB) or a registry. The main CPU 133 may access the DB in the storage 140 by using storage module 141-1 and detect various data. The security module 141-2 is a program module which supports hardware certification, request permission, or secure storage. The network module 141-3 supports network connection, and includes a Device Network (DNET) module or a Universal Plug and Play (UPnP) module.

The sensing module 142 is collects information from various sensors, analyzes, and manages the collected information. The sensing module 142 may include a face recognizing module, a voice recognizing module, a motion recognizing module, a NFC recognizing module, and the like.

The communicating module 143 is provided for external communication. The communicating module 143 may include a messaging module 143-1 such as a messenger program. Short Message Service (SNS) and Multimedia Message Service (MMS) program, an e-mail program, and the like. The communicating module 143 may include a calling module 143-2 such as a call info aggregator program module and a VoIP module.

The presentation module 144 creates a display screen. The presentation module 144 includes a multimedia module 144-1 to play and output multimedia content, and a UI rendering module 144-2 to process a UI and a graphic. The multimedia module 144-1 may include a player module, a camcorder module, a sound processing module, and the like. Thus, the multimedia module 144-1 plays various multimedia content, and creates and plays screens and sounds. The UI rendering module 144-2 may include a coordinate combining module to combine and create coordinates of the screen in which images may be displayed, a X11 module to receive sorts of events from hardware, and a Two Dimensional 2D/Three Dimensional (3D) UI toolkit to provide tools for creating a UI of 2D or 3D.

The web browser module 145 performs web browsing and accesses web server. The web browser module 145 may include various modules such as a web view module to create a web page, a download agent module to perform downloading, a bookmark module, a webkit module, and the like.

The service module 146 includes various applications to provide various services. Specifically, the service module 146 may include various program modules such as a navigation program, a content play program, a game program, an electronic book program, a calendar program, an alarm manage program, or various other widgets.

Although FIG. 3A illustrates various program modules, according to exemplary embodiments of the present invention, certain program module(s) may be excluded, modified, or added according to types and features of the user terminal apparatus 100. For example, a position base module for operating in association with hardware such as a GPS chip and for supporting position base service may be further included.

Referring to FIG. 3B, an example of a multi-window framework architecture on system (ex. Android® system) used by the user terminal apparatus 100 according to an exemplary embodiment of the present invention in order to display a plurality of application windows on a screen is provided. The framework architecture of FIG. 3B may be one component of the software illustrated in FIG. 3A; however, this will be explained by referring to a separate drawing for convenient explanation.

As illustrated in FIG. 3B, the multi-window framework architecture may include an application framework 310 and a multi-window framework 320. In this case, the multi-window framework 320 may operate separately from the application framework 310.

The application framework 310 may include an activity manager 311, a window manager 312, and a view system 313. The multi-window framework 320 may include a multi-window manager 321.

As applications are executed, the activity manager 311 may call information corresponding to an executing window of the executed application to the multi-window framework. The activity manager 311 may receive information regarding display mode, size and position of an application executing window based on a life cycle of the application executing window from the multi-window framework. The activity manager 311 may call information regarding display mode, size and position of the application executing window during creating step of the life cycle of the application executing window.

Further, the window manager 312 may confirm the application executing window corresponding to a touch inputted by a user. The window manager 312 may provide position information on a display corresponding to a touch input of a user to the multi-window framework, and receive information of the application executing window corresponding to the touch input determined by the multi-window framework from the multi-window framework.

According to exemplary embodiments of the present invention, in response to a touch input of a user, the window manager 312 may receive information regarding position and size of application executing window from the multi-window framework, and determine application executing window corresponding to touch input of a user based on the received position and size of application executing window.

The view system 313 may confirm positions and sizes of widget window and pop-up window. In this case, the multi-window framework 320 may determine sizes and positions of widget window and pop-up window, and the view system 313 may receive information regarding sizes and positions of widget window and pop-up window from the window framework.

The multi-window manager 321 included in the multi-window framework 320 manages various operations regarding multi-window functions provided from the user terminal apparatus 100, and provides various Application Programming Interfaces (APIs) regarding multi-window functions. Further, multi-window service may store various APIs regarding multi-window functions. An API regarding common functions of single window and multi-window may be embodied as common class, and an API regarding functions only applied in multi-window may be implemented so as to be divided according to display mode. The application framework 310 may further include a content provider 314, a package manager 315, a telephone manager 316, a resource manager 317, a position manager 318, a notice manager 319, and the like, but they are not related to the present invention, and thus further explanations will be omitted.

The multi-window framework 320 may further include a multi-window service 322, which will not be further explained because service to be provided is described above.

FIGS. 4A to 4D are diagrams illustrating a method of displaying application supporting multi-window mode according to an exemplary embodiment of the present invention.

Referring to FIGS. 4A-4D, various menu items may be displayed as icon interface format on an initial screen according to an exemplary embodiment of the present invention. For example, a first menu item 10 may be displayed on a lower center area of a screen, and a second menu item 20 may be displayed on an upper right area of a screen. The first menu item 10 operates to display applications that support multi-window mode on a specific screen area, and the second menu item 20 operates to arrange and display all applications which may be provided by the user terminal apparatus 100 according to user manipulation on an entire screen area.

If the first menu item 10 is selected, referring to FIG. 4B, application icons (hereinbelow, 'applications') referring to applications that support multi-window mode are displayed in a line on a lower portion of the screen. For convenient explanation, the area displaying the applications in a line is referred to as a 'mini tray' 420.

Further, a third menu item 30 and a fourth menu item 40 may be displayed on left and right sides of the first menu item 10. The third menu item 30 operates to provide various formats of templates defining layouts to arrange a plurality of application windows on a screen in multi-window mode. The fourth menu item 40 operates to provide a list of applications that are currently implemented on the multi-window mode.

If a user manipulation of touching the mini tray 420 and dragging the mini tray 420 toward a specific direction is inputted, applications move toward dragging direction as in FIG. 4C.

If the user touch manipulation ceases, referring to FIG. 4D, movement of application stops with the display state being maintained at the moment the touch manipulation is ceased.

For example, in a state in which the first to fifth applications 421 to 425 are displayed on the mini tray 420, if a user touches a specific application 424 and drags the mini tray 420 to the left direction, the application 424 moves by a distance as long as a user drags, and other icons on the mini tray 420 moves toward the same direction. Further, in a state in which third to seventh applications 423 to 427 are displayed on the mini tray 420, if user touch manipulation ceases, movement of applications on the mini tray 420 stops in the current displaying state.

Figure 5A:
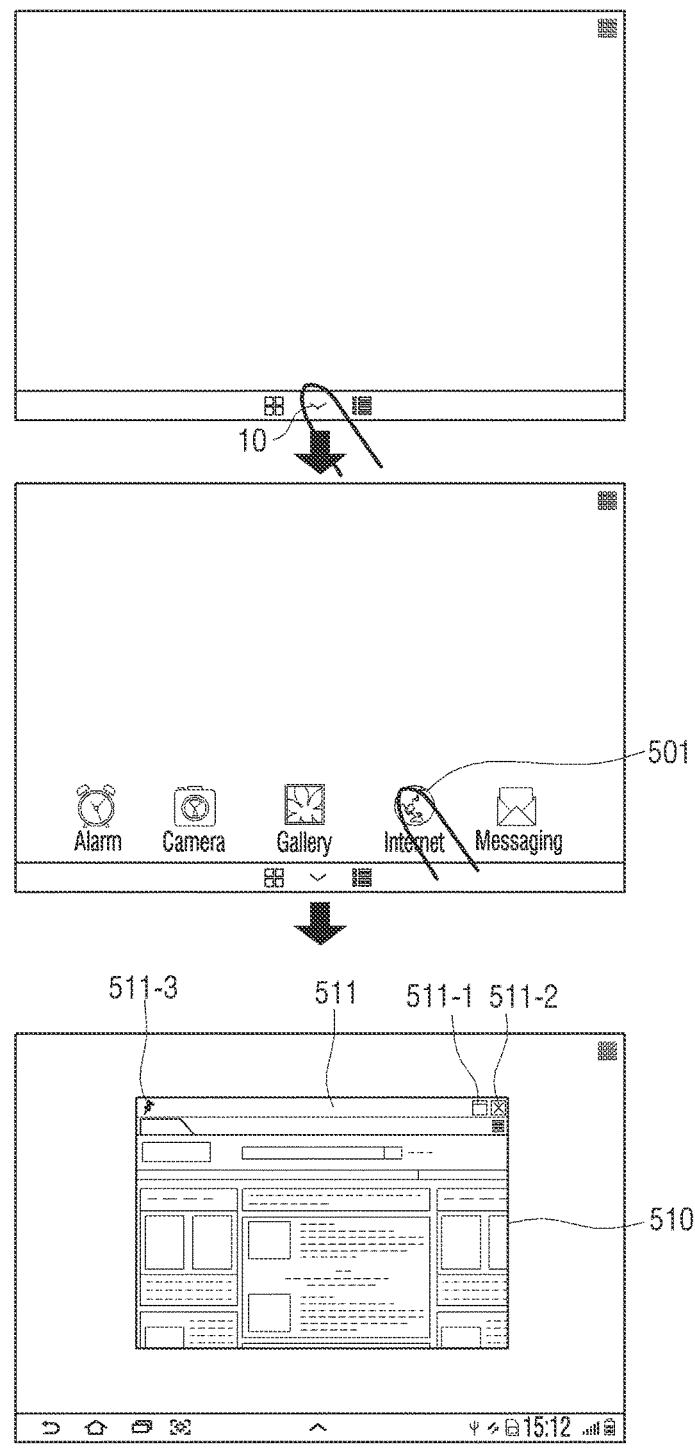
FIGS. 5A and 5B are diagrams illustrating display formats of an application window when an application is executed on multi-window mode and normal mode according to an exemplary embodiment of the present invention.
Figure 5B:
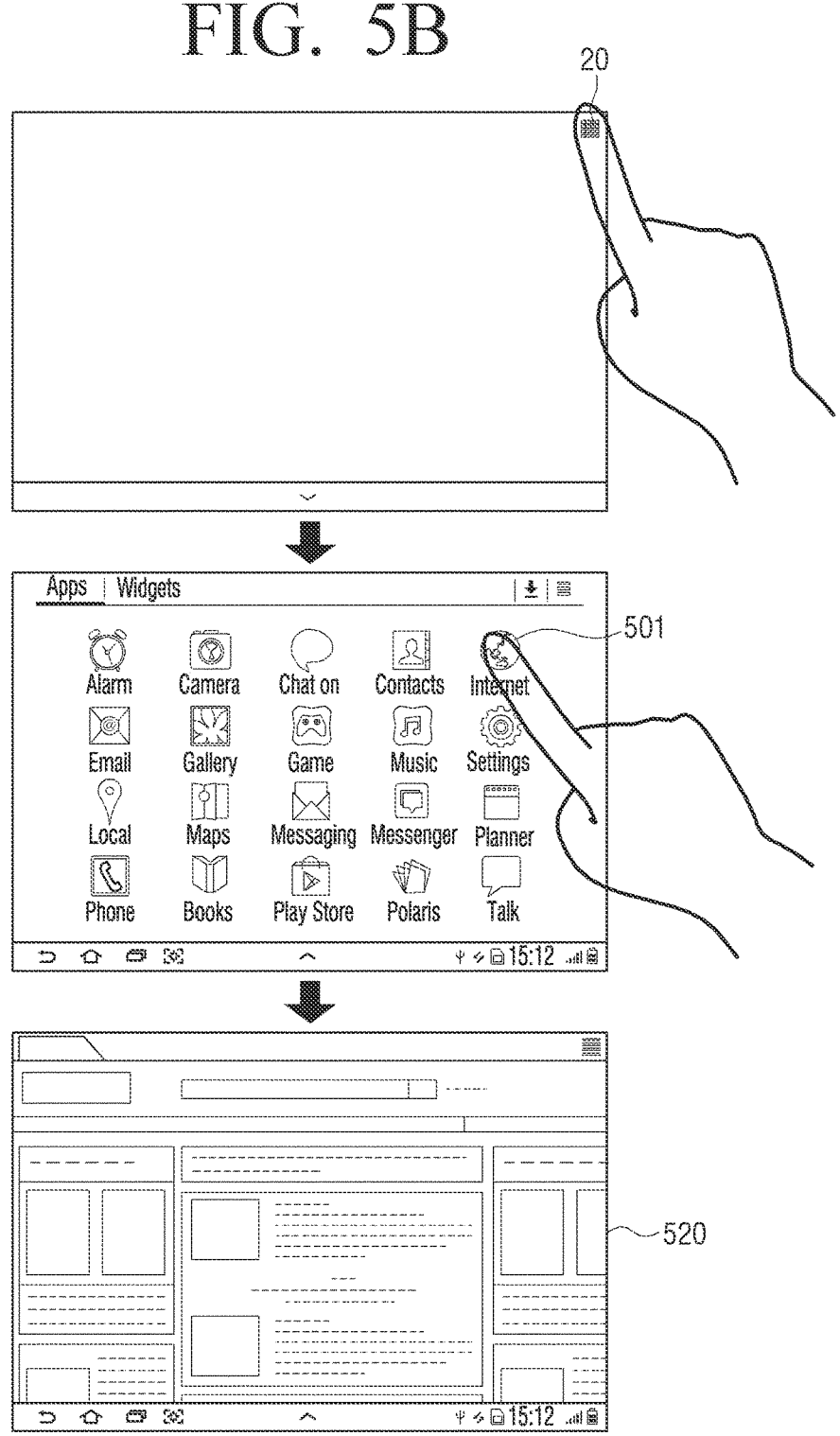

FIGS. 5A and 5B are diagrams illustrating display formats of an application window when an application is executed on multi-window mode and normal mode according to an exemplary embodiment of the present invention.

Referring to FIG. 5A, if the first menu item 10 is selected, applications that support multi-window mode may be displayed on a lower portion of the screen. If a specific application 501 is selected, a corresponding application window 510 may be displayed in mini mode format. In this case, the title area 511 may be displayed on the application window 510 and various menu items to support multi-window mode may be displayed on the title area 511. For example, menu items may include a maximization button 511-1, a complete button 511-2, and a pin-up button 511-3, and the like.

Referring to FIG. 5B, if the second menu item 20 is selected, all the applications that the user terminal apparatus 100 can provide may be displayed on the entire screen area. If a specific application 501 is selected, a corresponding application window 520 may be displayed on maximization mode. According to exemplary embodiments of the present invention, the title area may not be displayed on the application window 520.

Thus, even if the same application is selected, different corresponding application windows may be displayed depending on a user intention and/or preferences. If a user intends to execute an application on multi-window mode, a window may be displayed in mini mode which enables implementation of the functions such as moving a window position, adjusting size, pin-up, and the like. If a user intends to execute an application on normal mode, the window may be displayed in maximization mode. Thus, the window displaying can be implemented by considering a user intention according to the user's convenience and/or preferences.

FIGS. 6A to 6D are diagrams illustrating a method of displaying screen according to an exemplary embodiment of the present invention.

Referring to FIG. 6A, a first menu item 10 is selected in a state in which a plurality of application windows 610 to 630 are displayed on foreground or on background of a screen on a user terminal apparatus 100 according to an order of operations.

Referring to FIG. 6B, applications that support multi-window mode are displayed on mini tray area on a lower screen. Further, a third menu item 30 and a fourth menu item 40 to support multi-window mode may be displayed on left and right sides of the first menu item 10. The plurality of application windows 610 to 630 may be displayed on a background of the screen and may be displayed in a dimmed state, a dark state, or the like.

Referring to FIG. 6C, if the third menu item 30 is selected, the template providing area 650 having various types of templates 651 to 655 to arrange a plurality of application windows on a multi-window mode may be displayed.

Referring to FIG. 6D, if a template 653 of at least one provided templates is selected, a plurality of executed application windows 610 to 630 may be arranged and displayed based on the selected template. In this case, on the screen of FIG. 6A, application windows may be arranged consecutively from left to right direction, or from upper to lower direction according to a sequence of: an application window 610 displayed on a highest portion, an application window 620 displayed therebelow, and an application window 630 displayed on a lowest portion.

FIGS. 7A to 7E are diagrams illustrating a method of displaying screen according to an exemplary embodiment of the present invention.

Figure 7A:
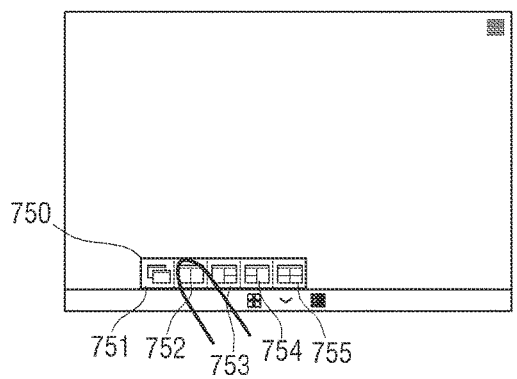

Referring to FIG. 7A, one template 752 is selected in a state when a template providing area 750 having a plurality of templates 751 to 755 is displayed.

Figure 7B:
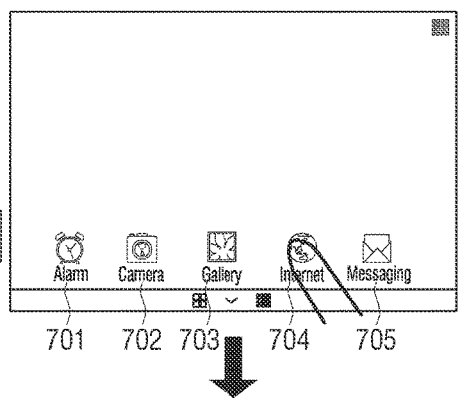
Figure 7D:
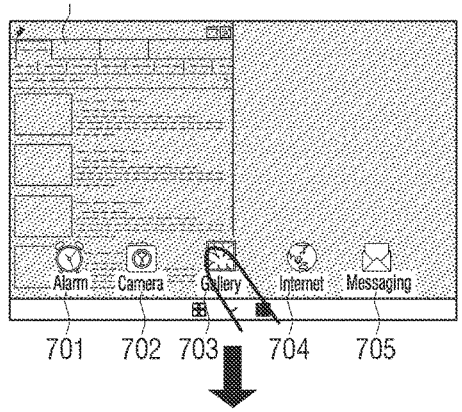
Figure 7C:
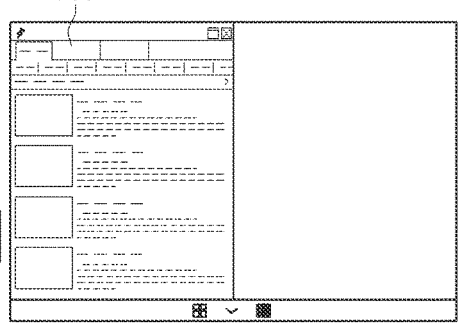

Referring to FIGS. 7B and 7C, if one application 704 is selected according to user manipulation in a state in which applications 701 to 705 that support multi-window mode are displayed, a screen may be provided, in which the window 710 of the selected application corresponding to the selected template is arranged.

Figure 7E:
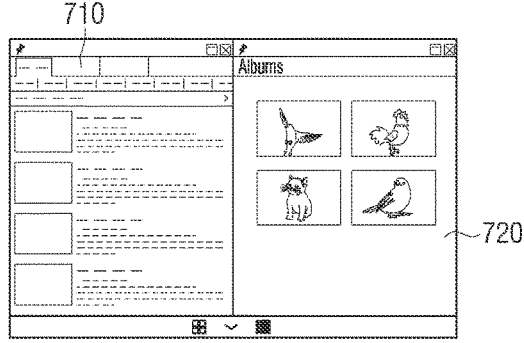

Referring to FIGS. 7D and 7E, if another application 703 is additionally selected according to user manipulation in a state in which applications 701 to 706 that support multi-window mode are displayed, a screen may be provided by adding and arranging window 720 of the selected application corresponding to the selected template.

According to exemplary embodiments of the present invention, if one application is selected on a mini tray having applications that support multi-window mode, a screen may be displayed by arranging the selected application corresponding to the selected template, and another application may be additionally selected to arrange new application on the selected template.

Figure 8A:
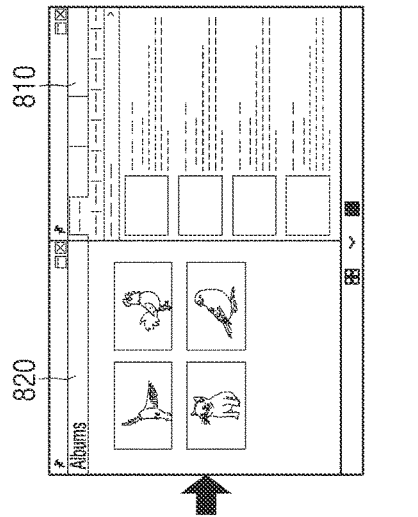
Figure 8B:
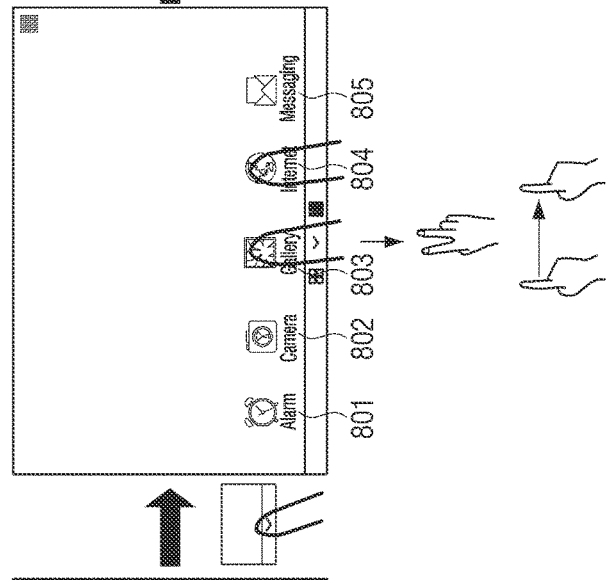
Figure 8C:
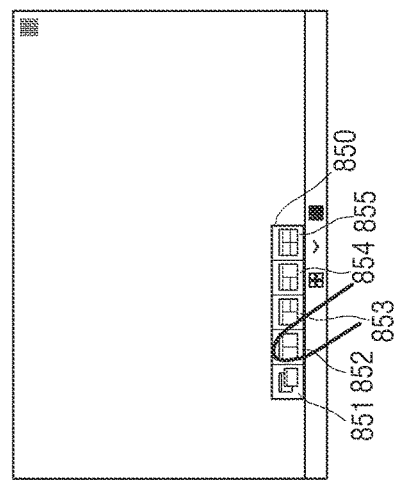

FIGS. 8A to 8C are diagrams illustrating a method of displaying screen according to an exemplary embodiment of the present invention.

Referring to FIG. 8A, one template 852 is selected in a state in which a template providing area 850 having a plurality of templates 851 to 855 is displayed.

Referring to FIGS. 8B and 8C, if a plurality of applications 803 and 804 are selected in a state in which applications 801 to 806 that support multi-window mode are displayed according to user manipulation, a screen arranging windows 810 and 820 of the selected a plurality of applications corresponding to the selected template may be provided. According to exemplary embodiments of the present invention, the plurality of applications 801, 805 may be selected simultaneously or consecutively as illustrated in FIG. 8B.

According to exemplary embodiments of the present invention, if a plurality of applications is selected on a mini tray having applications that multi-window mode can support, a screen arranging the selected a plurality of applications corresponding to the selected template may be displayed.

FIGS. 9A to 9C are diagrams illustrating explain a method of displaying screen according to an exemplary embodiment of the present invention.

Referring to FIGS. 9A and 9B, in a state in which a plurality of currently-executed application windows 901 to 903 are arranged based on the selected template, if user manipulation on a screen (e.g., if a pinch-in manipulation is inputted with respect to the screen), the window edit mode screen may be provided as illustrated in FIG. 9B. Meanwhile, user manipulation to enter the window edit mode is not limited to the above, and various gesture manipulations are available.

As illustrated in FIG. 9B, on the window edit mode, an application arranging area 910 including the currently-executed applications 911 to 913 may be provided on a lower screen. According to exemplary embodiments of the present invention, an image corresponding to the application may be indicated on part of the window area so that a user can recognize the application.

On the window edit mode, the selected template format 920 may be displayed on a center area of the screen, and a template area 950 having templates that are available may be displayed on an upper right area of the screen.

According to exemplary embodiments of the present invention, a user may drag-and-drop the applications displayed on a lower area of the windows 921 to 923 included in the displayed template 920 to a desired window. For example, a first application 911 may be placed on a first window 921, a second application 912 on a second window 922, and a third application 913 on a third window 923.

Referring to FIG. 9C, the applications 911 to 913 placed on a template 920 may disappear from the application arranging area 910. Window size of moved application may be automatically adjusted to correspond to the window size of the template.

If there is no application arranging manipulation by drag-and-drop manipulation, it is available that an application displayed on a lower area of a window according to a predetermined order is automatically arranged on windows 912 to 923.

According to exemplary embodiments of the present invention, a template area, a position and a size of an arranging application display area may be variously modified.

FIGS. 10A and 10B are diagrams illustrating a method of displaying screen according to an exemplary embodiment of the present invention.

Referring to FIGS. 10A and 10B, if user manipulation (e.g., a pinch-out manipulation, or the like) is inputted on the window edit mode screen, the window edit mode may finish. For example, as illustrated in FIG. 10B, a screen in which position of application window is adjusted to a format edited on the window edit mode may be displayed.

Figure 11A:
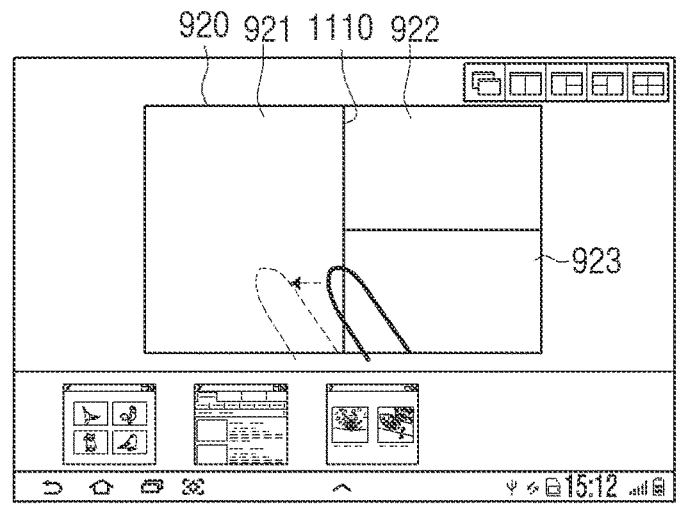
Figure 11B:
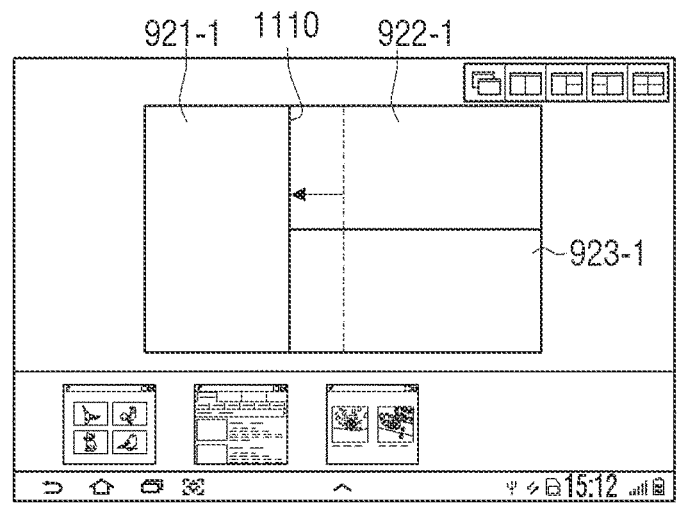

FIGS. 11A and 11B are diagrams illustrating a method of displaying screen according to an exemplary embodiment of the present invention.

Referring to FIGS. 11A and 11B, a template may be edited according to a manipulation of moving window boundary within template on the window edit mode screen. For example, if a user manipulation is inputted by touching a boundary line 1110 of a first window 921, a second window 922, and a third window 923 within the template 920 and dragging the boundary line 110 to the left side, the template 920 may be modified to a format in which the boundary line 1110 moves to the left side. When the template is modified to a new format, the new format includes a first window 921-1, a second window 922-1, and a third window 923-1 with a boundary line 1110.

According to exemplary embodiments of the present invention, a template edit mode screen may also be provided, separately from the window edit mode screen.

Figure 12A:
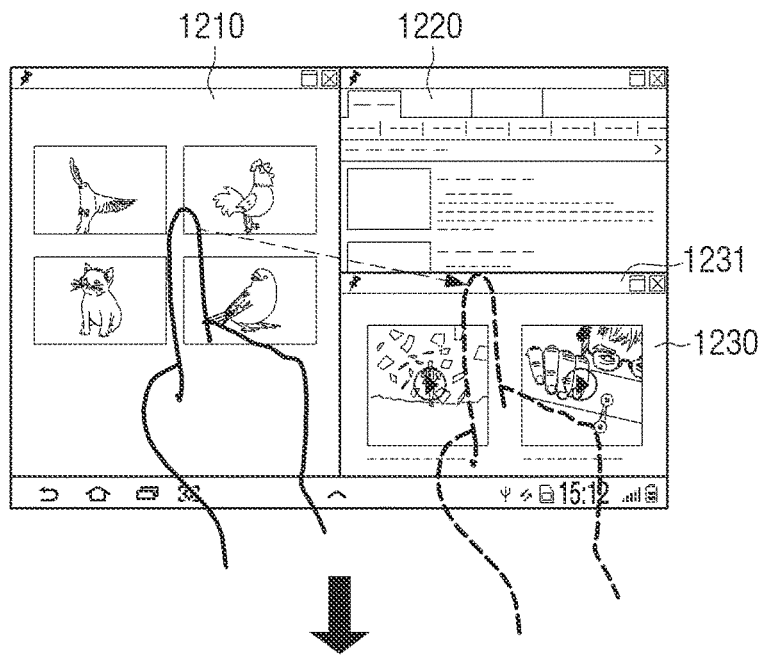
Figure 12B:
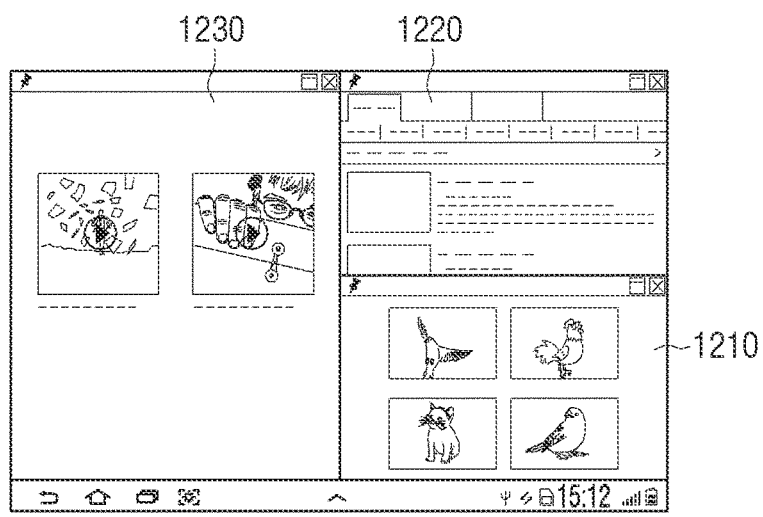

FIGS. 12A and 12B are diagrams illustrating a method of displaying screen according to an exemplary embodiment of the present invention.

Referring to FIGS. 12A and 12B, in a state in which first to third application windows 1210 to 1230 are arranged and displayed based on the selected template, the title area 1231 of the third application window 1230 may be touched and dragged (or dragged and dropped) in the direction of the first application window 1210.

According to exemplary embodiments of the present invention, the third application window 1230 may be displayed on position of the first application window 1210 and the first application window 1210 may be displayed on position of the third application window 1230. For example, the first application window 1210 and the third application window 1230 may be interchanged as illustrated in FIGS. 12A and 12B. The first and third application windows 1210 and 1230 moved as illustrated may be adjusted and displayed to a size corresponding to each area, respectively.

Although not illustrated in the drawing, in a state in which the first to third application windows 1210 to 1230 are arranged and displayed based on the selected template, a window size can be adjusted according to user manipulation. For example, a window size may be adjusted by touching and dragging boundary area of application window. In this case, information on the modified template state may be stored, and the template may be stored in the same manner as the modified template state.

Figure 13A:
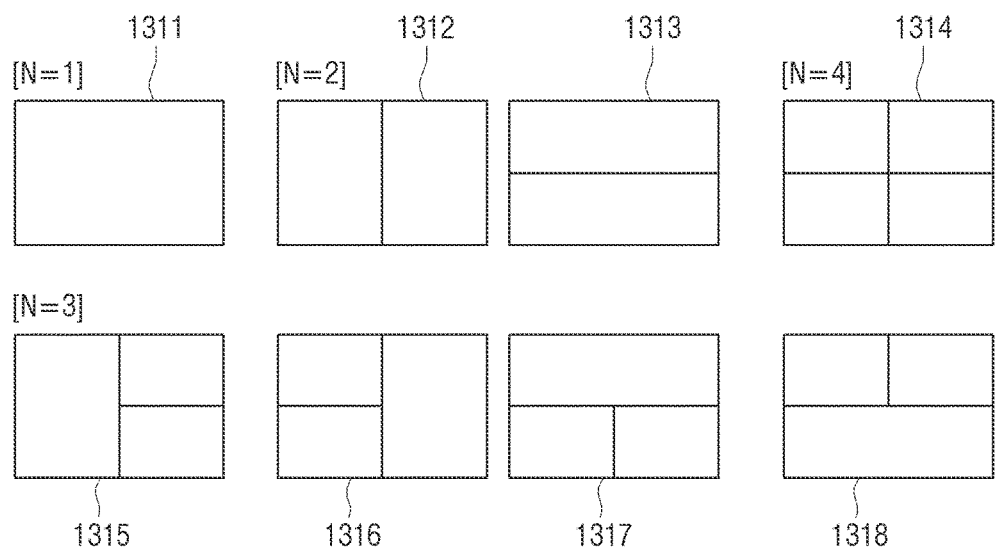
FIGS. 13A and 13B are diagrams illustrating template formats according to exemplary embodiments of the present invention.
Figure 13B:
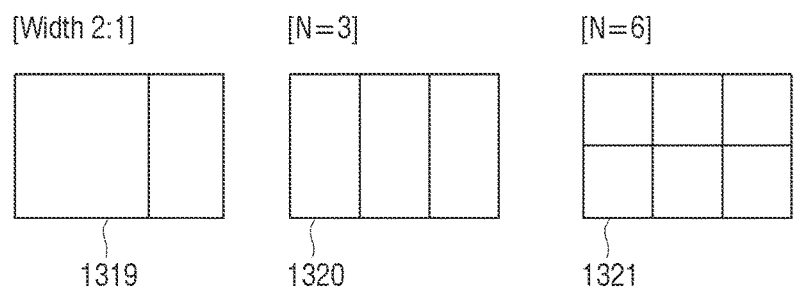

FIGS. 13A and 13B are diagrams illustrating template formats according to various exemplary embodiments of the present invention.

Referring to FIG. 13A, various templates 1311 to 1318 may be provided by the number of windows and previously stored. Although the template format with four windows is provided for illustrative purposes, exemplary embodiments of the present invention are not so limiting.

Referring to FIG. 13B, templates may be edited or created in various formats 1319 to 1321 according to a user needs. For example, it is possible to create a template in which window size is adjusted by moving position of window boundary line in a prestored template 1312 as illustrated in the left-most drawing.

Further, a new format of template can be created without using prestored templates as illustrated in the middle and right-most drawings. In addition, the corresponding template may be created by using prestored templates. For example, in the prestored template 1312, one window of two windows may be divided into two and boundary line may be adjusted, creating new template format in which three windows are arranged horizontally as the one illustrated in the middle drawing.

Figure 14A:
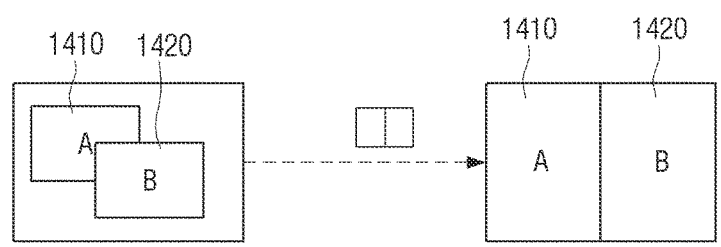
FIGS. 14A and 14B are diagrams illustrating a method of arranging application windows according to an exemplary embodiment of the present invention.
Figure 14B:
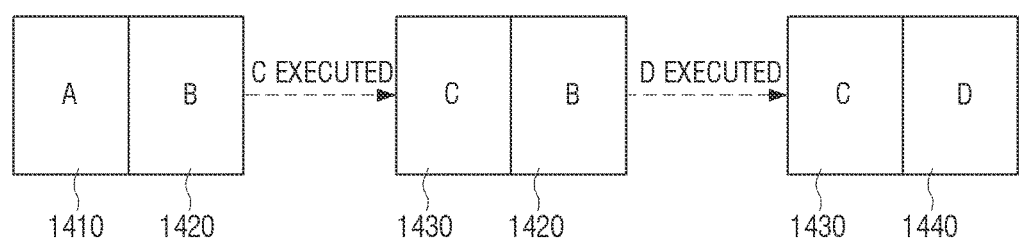

FIGS. 14A and 14B are diagrams illustrating a method of arranging application windows according to an exemplary embodiment of the present invention.

Referring to FIG. 14A, if a specific template is selected in a state in which two application windows (e.g., application window A 1410 and B application window B 1420) are simultaneously executed and displayed, the executed application window A 1410 and application window B 1420 may be arranged and displayed based on the selected template.

Referring to FIG. 14B, if a new application window (e.g., application window C 1430) is executed, application window C 1430 may be overlapped and displayed on the previously-executed application window A 1410.

If another new application window (e.g., application window D 1440) is executed, application window D 1440 may be overlapped and displayed on the previously-executed application window B 1420.

According to exemplary embodiments of the present invention, if a new application window is executed, the new application window may be overlapped and displayed on a previously displayed application window according to a predetermined arranging order.

Figure 15A:
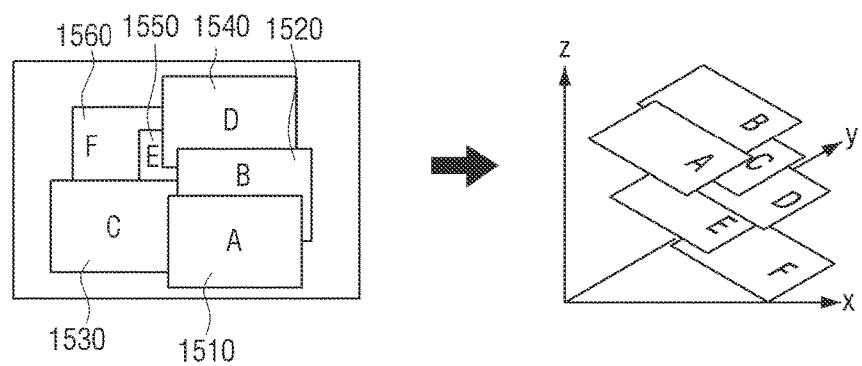
FIGS. 15A, 15B, and 15C are diagrams illustrating a method of arranging application windows according to an exemplary embodiment of the present invention.
Figure 15B:
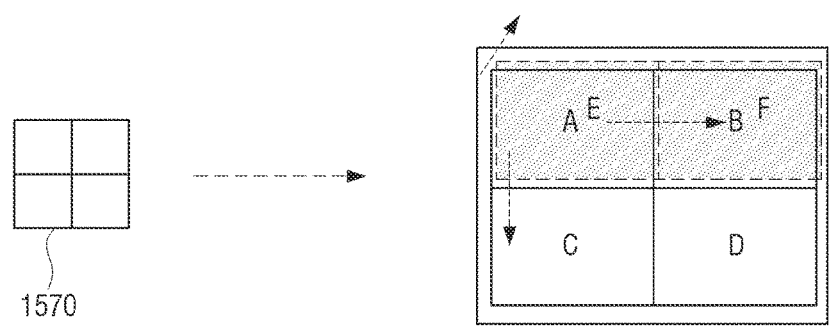
Figure 15C:
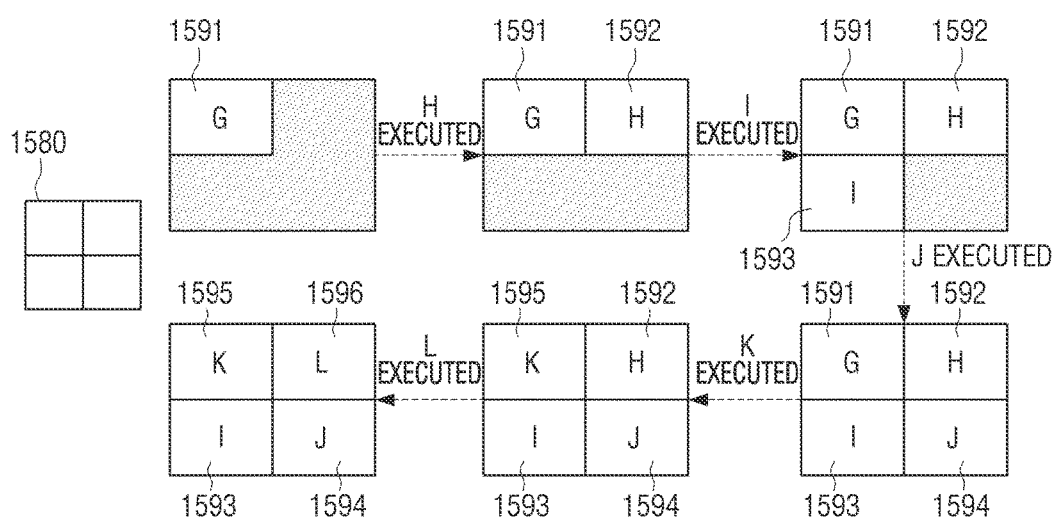

FIGS. 15A to 15C are diagrams illustrating a method of arranging application windows according to an exemplary embodiment of the present invention.

Referring to FIG. 15A, the plurality of currently-executed application windows 1510 to 1560 may have a Z-order corresponding to the order of displaying the windows on Z-axis of a screen. In other words, application window A 1510 to application window F 1560 may have a Z-order of 1 to 6.

Referring to FIG. 15B, the currently-executed application windows corresponding to application window A 1510 to application window F 1560 according to the predetermined arranging order on a selected template 1570 may be consecutively arranged based on the priority of higher Z-order. Thus, application window A 1510 having a 1 Z-order may be placed on upper left area and application window B 1520 having a 2 Z-order may put on upper right area. On lower left and right areas, application window C 1530 and application window D 1540 having 3 and 4 Z orders may be respectively placed. Application window E 1550 and application window F 1560 having 5 and 6 Z-orders respectively may be overlapped and displayed on the areas in which application window A 1510 and application window B 1520 having 1 and 2 Z-orders respectively are already arranged.

Referring to FIG. 15C, if application windows corresponding to application window G 1591 to application window L 1596 are executed after selecting a template 1580, the application windows may be consecutively arranged on the template 1580 according to an execution order. Thus, the first executed application window G 1591 may be arranged on upper left area, and the next executed application window H 1592 may be arranged on upper right area. On lower left and right areas, the next executed application windows corresponding to application window 11593 and application window J 1594 may be consecutively arranged. The next executed application windows corresponding to application window K 1595 and application window L 1596 may be overlapped and arranged consecutively on upper left and right areas.

Figure 16:
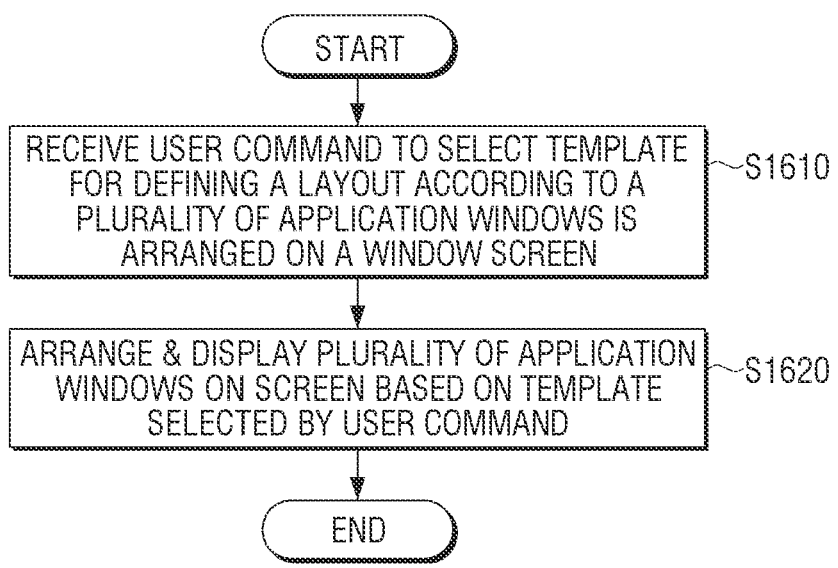
FIG. 16 is a flowchart illustrating a method of controlling a user terminal apparatus according to an exemplary embodiment of the present invention.

FIG. 16 is a flowchart illustrating a method of controlling a user terminal apparatus according to an exemplary embodiment of the present invention.

Referring to FIG. 16, at S1610, a user command to select a template defining layout is received, so that a plurality of application windows may be arranged on a screen.

At S1620, a plurality of application windows are arranged and displayed on a screen based on the selected template by the received user command.

According to exemplary embodiments of the present invention, the plurality of application windows may include at least one of application windows which are currently executed and application windows which are to be executed after selecting a template.

According to exemplary embodiments of the present invention, at S1620, a plurality of application windows may be arranged on window area within the selected template according to predetermined arranging order.

According to exemplary embodiments of the present invention, at S1620, the plurality of executed application windows may be consecutively arranged on window area within the template based on an order of arranging the plurality of executed application windows on Z-axis of a screen.

According to exemplary embodiments of the present invention, at S1620, if the number of executed application windows is more than the number of window areas within a template, executed application windows may be overlapped and arranged on window area within a template. If the number of executed application windows is less than the number of window areas within a template, window areas in which application windows are not arranged may be displayed as blank among window areas within a template.

If the first currently-executed application window is arranged on the first window area within a template and if the second currently-executed application window is overlapped and arranged on the first window area within the template, the second application window may be overlapped and arranged on a lower portion of the first application window.

According to exemplary embodiments of the present invention, at S1620, at least one of application windows executed after selecting a template may be consecutively arranged on the window areas within a template based on the order of execution.

According to exemplary embodiments of the present invention, at S1620, if new application window is executed in a state in which the plurality of currently-executed application windows are arranged and displayed on all window areas within a template, the new application window may be overlapped and displayed on an upper portion of one of the plurality of executed application windows.

Further, according to a predetermined user command, at least one of window edit mode to arrange a plurality of executed application windows within a template by a user selection, and a template edit mode for a user to edit prestored templates or to create new templates also may be provided.

According to exemplary embodiments of the present invention, the controlling method may be implemented to be a computer program and provided to a user terminal apparatus. For example, if a template for defining layout to arrange a plurality of application windows on a screen is selected, non-transitory computer readable medium storing program may be provided, in which the program arranges a plurality of application windows on a screen based on the selected template.

The 'non-transitory computer readable medium' as used herein refers to medium that can store data semi-permanently and can be read by apparatuses, rather than a medium that can store data temporarily such as a register, a cache, and a memory. Specifically, non-transitory computer readable medium such as the CD, the DVD, a hard disk, the Blu-ray disk, the USB, a memory card, and the ROM may store and provide the above various applications or programs.

The foregoing exemplary embodiments and advantages are merely exemplary and are not to be construed as limiting the present invention. The present teaching can be readily applied to other types of apparatuses. Also, the description of the exemplary embodiments of the present invention concept is intended to be illustrative, and not to limit the scope of the claims.

What is claimed is:

1. A user terminal apparatus, the apparatus comprising:
a display configured to display a screen;
a storage configured to store at least one template for defining a layout of application windows;
a user interface configured to receive user inputs; and
a processor configured to:
control to display a plurality of application windows having different order on a Z-axis on a single area of the screen,
control to rearrange the displayed plurality of application windows on a plurality of areas in the template selected by a user input, based on an order of the displayed plurality of application windows on a Z-axis and a number of the displayed plurality of application windows,
control to display the rearranged plurality of application windows on the screen, the template including a plurality of areas for displaying application windows, and
if a number of the displayed plurality of application windows is greater than a number of the plurality of areas in the template, control to display first application windows corresponding to a number of the plurality of areas among the displayed plurality of application windows in each of the plurality of areas and display the rest of windows among the displayed plurality of application windows to overlap with the first application windows,
wherein a window of an earliest order on the Z-axis among the rest of windows is displayed to overlap with a window of an earliest order on the Z-axis among the first application windows.

2. The user terminal apparatus of claim 1, wherein the processor arranges the displayed plurality of application windows on window areas within the selected template according to a predetermined arranging order.

3. The user terminal apparatus of claim 2, wherein, in response to the number of the displayed plurality of application windows being more than the number of the window areas within the template, the processor overlaps and displays the plurality of application windows on the window areas within the template, and in response to the number of the displayed plurality of application windows being less than the number of the window areas within the template, the processor displays the window areas such that application windows are not arranged as blank among the window areas within the template.

4. The user terminal apparatus of claim 3, wherein, in response to one displayed application window being arranged on one window area within the template and another displayed application window being arranged to be overlapped on the one window area within the template, the processor overlaps and displays the another application window on a lower portion of the one application window.

5. The user terminal apparatus of claim 2, wherein the processor consecutively arranges at least one application window executed after selecting of the template on the window areas within the template according to an order of execution.

6. The user terminal apparatus of claim 5, wherein, in response to a new application window being executed in a state in which the at least one executed application window is arranged and displayed on all the window areas within the template, the processor overlaps and displays the new application window on an upper portion of one of the displayed plurality of application windows.

7. The user terminal apparatus of claim 1, wherein the displayed plurality of application windows are consecutively arranged on window areas within the template based on a priority of a higher Z-order for arranging the displayed plurality of application windows on the Z-axis.

8. The user terminal apparatus of claim 1, wherein the processor provides, according to a predetermined user command, at least one of a window edit mode in which a plurality of executed application windows are arranged within the template according to user selection; and a template edit mode in which the user performs at least one of editing a prestored template and creating a new template.

9. The user terminal apparatus of claim 1, wherein, in response to a predetermined menu item being selected, the processor displays at least one template on an area of the screen.

10. The user terminal apparatus of claim 1, wherein the user terminal apparatus includes an input unit into which a touch input is entered.

11. A method of controlling a user terminal apparatus, the method comprising:
receiving a user command to select a template for defining a layout of application windows;
rearranging the displayed plurality of application windows having different order on a Z-axis on a single area of the screen on a plurality of areas of the selected template according to the user command, based on an order of the displayed plurality of application windows on a Z-axis and a number of the displayed plurality of application windows; and
displaying the rearranged plurality of application windows on the screen, the template including a plurality of areas for displaying application windows, wherein the rearranging of the displayed plurality of application windows comprises:
if a number of the displayed plurality of application windows is greater than a number of the plurality of areas in the template, rearranging first application windows corresponding to a number of the plurality of areas among the displayed plurality of application windows in each of the plurality of areas, and arranging the rest of windows among the displayed plurality of application windows to overlap with the first application windows,
wherein a window of an earliest order on the Z-axis among the rest of windows is displayed to overlap with a window of an earliest order on the Z-axis among the first application windows.

12. The method of claim 11, wherein the rearranging of the displayed plurality of application windows comprises arranging the displayed plurality of application windows on window areas within the selected template according to a predetermined arranging order.

13. The method of claim 12, wherein the rearranging of the displayed plurality of application windows comprises, in response to the number of the displayed plurality of application windows being more than the number of the window areas within the template, overlapping and displaying the plurality of applications windows on the window areas within the template, and in response to the number of the displayed plurality of application windows being less than the number of the window areas within the template, displaying the window areas such that application windows are not arranged as blank among the window areas within the template.

14. The method of claim 13, wherein the rearranging of the displayed plurality of application windows comprises, in response to one executed application window being arranged on one window area within the template and another executed application window being arranged to be overlapped on the one window area within the template, overlapping and displaying the another application window on a lower portion of the one application window.

15. The method of claim 12, wherein the rearranging of the displayed plurality of application windows comprises consecutively arranging at least one application window executed after selecting of the template on the window areas within the template according to an order of execution.

16. The method of claim 15, wherein, in response to a new application window being executed in a state in which the at least one executed application window is arranged and displayed on all the window areas within the template, the method further comprises overlapping and displaying the new application window on an upper portion of one of the displayed plurality of application windows.

* * * * *